United States Patent
Yano et al.

(10) Patent No.: US 9,769,265 B2
(45) Date of Patent: Sep. 19, 2017

(54) COMMUNICATION SYSTEM, MANAGEMENT COMPUTER, AND SESSION INFORMATION MIGRATION METHOD

(71) Applicant: Hitachi, Ltd., Tokyo (JP)

(72) Inventors: Masashi Yano, Tokyo (JP); Tsutomu Hirao, Tokyo (JP); Michitaka Okuno, Tokyo (JP); Nodoka Mimura, Tokyo (JP); Daisuke Ishii, Tokyo (JP); Yuta Muto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 133 days.

(21) Appl. No.: 14/734,299

(22) Filed: Jun. 9, 2015

(65) Prior Publication Data
US 2016/0065678 A1 Mar. 3, 2016

(30) Foreign Application Priority Data
Aug. 26, 2014 (JP) ................................. 2014-171307

(51) Int. Cl.
*G06F 11/00* (2006.01)
*H04L 29/08* (2006.01)

(52) U.S. Cl.
CPC ...... *H04L 67/148* (2013.01); *H04L 29/08639* (2013.01)

(58) Field of Classification Search
CPC ....................... H04L 67/148; H04L 29/08639
USPC ................................. 709/227, 228, 220–222
See application file for complete search history.

(56) References Cited

U.S. PATENT DOCUMENTS

| | | | | |
|---|---|---|---|---|
| 7,487,248 B2* | 2/2009 | Moran | ..................... | H04L 67/14 709/206 |
| 7,809,842 B2* | 10/2010 | Moran | ..................... | H04L 67/14 709/206 |
| 8,412,185 B2* | 4/2013 | Cader | ..................... | H04M 3/58 370/353 |
| 2004/0068567 A1* | 4/2004 | Moran | ..................... | H04L 67/14 709/227 |
| 2006/0259628 A1* | 11/2006 | Vadlapudi | ............. | H04W 28/24 709/227 |

(Continued)

FOREIGN PATENT DOCUMENTS

JP 2012-103879 A 5/2012

*Primary Examiner* — Kenneth R Coulter
(74) *Attorney, Agent, or Firm* — Volpe and Koenig, P.C.

(57) ABSTRACT

A communication system comprising computers and a management computer, wherein the computers include a communication control unit configured to control a communication using a session of a terminal. The communication control unit manages a database storing in a plurality of pieces of session information. The management computer includes property management information for managing a property of each of the plurality of pieces of session information. The session information migration control unit is configured to: detect a migration trigger of the plurality of pieces of session information stored in a first database; select the plurality of pieces of session information from the plurality of pieces of session information stored in the first database based on the property management information; determine a migration order for the selected plurality of pieces of session information based on the property of the each of the selected plurality of pieces of session information.

15 Claims, 24 Drawing Sheets

(56) References Cited

U.S. PATENT DOCUMENTS

| | | | | |
|---|---|---|---|---|
| 2009/0063690 A1* | 3/2009 | Verthein | ............... | H04L 67/142 709/228 |
| 2009/0138606 A1* | 5/2009 | Moran | .................... | H04L 67/14 709/227 |
| 2011/0065384 A1* | 3/2011 | Cader | ..................... | H04M 3/58 455/41.1 |

* cited by examiner

| 401 | 402 | 403 | 404 | 405 | 406 | 407 | 408 | 409 | 410 | 111-1 |
|---|---|---|---|---|---|---|---|---|---|---|
| SESSION ID | IMSI | TERMINAL ADDRESS | GROUP NUMBER | BASE STATION ADDRESS | BASE STATION PORT NUMBER | BASE STATION TUNNEL ID | OWN ADDRESS | OWN PORT NUMBER | OWN TUNNEL ID | |
| AAAA | 311070123456789 | X.Y.Z.1 | 10 | A.B.C.10 | 2152 | 0xAABBCCDD | 10.A.B.C | 2152 | 0x11FFEEDD | |
| ... | ... | ... | ... | ... | ... | ... | ... | ... | ... | |

FIG. 4A 111-2

| 411 | 412 | 413 | 414 | 415 | 416 | 417 |
|---|---|---|---|---|---|---|
| SESSION ID | IMSI | TERMINAL ADDRESS | GROUP NUMBER | OWN ADDRESS | OWN PORT NUMBER | OWN TUNNEL ID |
| BBBB | 311170123456789 | X.Y.Z.2 | 10 | 10.A.B.C | 2152 | 0x11FFEEDD |
| ⋮ | ⋮ | ⋮ | ⋮ | ⋮ | ⋮ | ⋮ |

| 501 | 502 | 503 | 504 | 505 | 506 |
|---|---|---|---|---|---|
| SESSION ID | COMMUNICATION SERVER ID | COMMUNICATION SERVER ADDRESS | TERMINAL ADDRESS | TRANSMISSION VOLUME | RECEPTION VOLUME |
| AAAA | S1 | 11:22:44:55:66:77 | X.Y.Z.1 | 1Gbps | 2Gbps |
| ⋮ | ⋮ | ⋮ | ⋮ | ⋮ | ⋮ |

| 601 | 602 | 603 | 604 PROPERTY | |
|---|---|---|---|---|
| COMMUNICATION SERVER ID | STRUCTURE TYPE | SESSION ID | 605 STATUS | 606 DATA TYPE |
| S1 | PHYSICAL | AAAA | Active | MASTER |
| | | BBBB | Idle | MASTER |
| | | ⋮ | ⋮ | ⋮ |
| | | KKKK | Active | BACK UP |
| | | LLLL | Idle | BACK UP |
| | | ⋮ | ⋮ | ⋮ |
| ⋮ | ⋮ | ⋮ | ⋮ | ⋮ |

FIG. 6

| PHYSICAL SERVER ID | CPU USAGE RATE | MEMORY USAGE RATE | NUMBER OF USER ACCOMMODATED | PROCESS DATA VOLUME | COMMUNICATION VOLUME |
|---|---|---|---|---|---|
| S1 | 33% | 75% | 5000 | 1Gbps | 2Gbps |
| S2 | 13% | 54% | 1000 | 1Gbps | 1Gbps |
| ⋮ | ⋮ | ⋮ | ⋮ | ⋮ | ⋮ |

| PHYSICAL SERVER ID 1601 | CPU USAGE RATE 1602 | MEMORY USAGE RATE 1603 | VIRTUAL SERVER ID 1604 | VIRTUAL CPU USAGE RATE 1605 | VIRTUAL MEMORY USAGE RATE 1606 | NUMBER OF USER ACCOMMODATED 1607 | PROCESS DATA VOLUME 1608 | COMMUNICATION VOLUME 1609 |
|---|---|---|---|---|---|---|---|---|
| P_S1 | 58% | 70% | V_S1 | 33% | 75% | 5000 | 1Gbps | 2Gbps |
|  |  |  | V_S2 | 13% | 54% | 1000 | 1Gbps | 1Gbps |
| P_S2 | ... | ... | ... | ... | ... | ... | ... | ... |
| ... |  |  |  |  |  |  |  |  |

315

| POLICY ID | MIGRATION CONDITION | MIGRATION ORDER |
|---|---|---|
| 1 | TRANSFER VOLUME>A OR CPU>B | ACTIVE → IDLING (OPTION:PRIORITY) |
| 2 | INSUFFICIENT MEMORY | ACTIVE → IDLING |
| 3 | INCREASE IN NUMBER OF USER ACCOMMODATED | ACTIVE → IDLING |
| ⋮ | ⋮ | ⋮ |

FIG. 19

COMMUNICATION SYSTEM, MANAGEMENT COMPUTER, AND SESSION INFORMATION MIGRATION METHOD

CLAIM OF PRIORITY

The present application claims priority from Japanese patent application JP 2014-171307 filed on Aug. 26, 2014, the content of which is hereby incorporated by reference into this application.

BACKGROUND OF THE INVENTION

The present invention relates to the migration of the session information retained by a communication server.

In the mobile communication network, the widespread use of 4G LTE (Long Term Evolution) and WiMAX2+ (Worldwide Interoperability for Microwave Access) have enabled the use of high speed mobile broadband. Furthermore, with the availability of service such as LTE-Advanced, an expansion of the wireless band by carrier aggregation is enabling even faster mobile wireless communications.

The services utilizing LTE, in addition to internet access services, include VoLTE (Voice over LTE) service. With VoLTE service, a voice service utilizing a line switching service is realized by IP packet communications.

Now that the mobile communication network plays a significant role in the social infrastructure, failure prevention, swift recovery of network service during system failures, and service continuity are becoming prerequisite.

Now, the functions of the network nodes that used to require an exclusive apparatus are being realized by universal servers, such as those used in a data center, while NFV (Network Function Virtualization) which is operable at the virtual servers, configured virtually over the universal servers, has been studied. In the description below, universal servers configured to realize the features of the network nodes and the virtual servers realized over the universal server will be referred to as a communication server.

The system using the NFV is expected to increase the facility (scale out), decrease the facility (scale in) in accordance with the network load, change the system configuration due to migration of virtual servers for load distribution purposes, shorten a service down time which may occur during a system failure in a redundant system, and reduce an amount time needed for an effect to be apparent.

In response to the above stated expectations, a technology disclosed in a Japanese Unexamined Patent Application Publication No. 2012-103879 has been well known in the art. Japanese Unexamined Patent Application Publication No. 2012-103879 discloses "a session management method for a system having a plurality of server apparatus having a request allocation unit for returning a processing result of a client request to a client, a request processing unit for processing the received request, and a session information management unit for managing session information of the request, wherein the session information management unit of a first server apparatus moves information to the session information management unit of a second server apparatus, and the request allocation unit of the first server apparatus allocates the newly received request to the second server apparatus based on migration destination information of the moved session information in a case a migration time of the session information is later than a request received time when the request allocation unit of the first server apparatus receives a request and a response reply time when a processing result is replied to the client."

SUMMARY

According to the Japanese Unexamined Patent Application Publication No. 2012-103879, by moving the session information in a case of performing scale out such as increasing virtual servers, or the like, virtual servers with higher capability are connected with sessions with higher priority. By this the quality of high priority session is ensured.

However, according to the technology disclosed in the Japanese Unexamined Patent Application Publication No. 2012-103879 no consideration is given to, among other things, interruption of service while the session information is moved. Accordingly, there is a possibility that communication server may experience an extended interruption in a case of moving a large volume of session information to the virtual servers having higher capabilities. In other words, such system does not allow the effect of scale out to be apparent in a swift manner.

Objectives of the present invention include reduction of interruption time of a communication service in a case the session information is moved to accompany scale out, or the like, and to provide a communication system, an apparatus, and a migration method of session information operable to reduce the amount of time needed to reflect an effect of scale out, or the like.

The present invention can be appreciated by the description which follows in conjunction with the following figures, wherein: a communication system comprising a plurality of computers and a management computer, wherein each of the plurality of computers includes a communication control unit configured to accommodate a plurality of terminals, and control a communication using a session of each of the plurality of terminals. The communication control unit manages a database storing therein a plurality of pieces of session information, each of the plurality of pieces of session information corresponds to the session of each of the plurality of terminals. The management computer includes: an information obtaining unit configured to obtain operation information indicating an operation status of the plurality of computers; a session information migration control unit configured to detect a migration trigger of the plurality of pieces of session information stored in the database managed by an arbitrary communication control unit, and move the plurality of pieces of session information stored in the database managed by the arbitrary communication control unit to a database managed by another communication control unit; property management information for managing a property of each of the plurality of pieces of session information stored in the database managed by the communication control unit; and operation management information for managing an operation status of the plurality of computers. The plurality of computers include a first computer operated by a first communication control unit configured to manage a first database, and a second computer operated by a second communication control unit configured to manage a second database. The session information migration control unit is configured to: detect the migration trigger of the plurality of pieces of session information stored in the first database based on the operation management information; select the plurality of pieces of session information to be moved to the second database from the plurality of pieces of session information stored in the first database based on the property management information;

determine a migration order for the selected plurality of pieces of session information based on the property of the each of the selected plurality of pieces of session information; and generate migration control information including the determined migration order.

According to the present invention, the management computer determines the migration order via which the plurality of pieces of session information is moved based on the session property and in a manner to swiftly reflect the effect of the migration of the session information. By moving the plurality of pieces of session information in the determined migration order, it becomes possible to reduce the interruption time of communication services and the amount of time needed to reflect the effect of scale out, or the like. Objects, configurations, and effects other than those described above become apparent from the following descriptions of embodiments of this invention.

BRIEF DESCRIPTION OF THE DRAWINGS

The present invention can be appreciated by the description which follows in conjunction with the following figures, wherein:

FIG. 4A and FIG. 4B are explanatory tables each illustrating an example of a database stored in a communication server according to the first embodiment;

FIG. 5 is an explanatory table illustrating an example of load management information stored in a load distribution apparatus according to the first embodiment;

FIG. 6 is an explanatory table illustrating an example of property management information stored in the management server according to the first embodiment;

FIG. 7 is an explanatory table illustrating an example of operation management information stored in the management server according to the first embodiment;

FIG. 16 is an explanatory table illustrating an example of the operation management information stored in the management server according to the third embodiment;

FIG. 19 is an explanatory table illustrating an example of policy information stored in the management server according to the fourth embodiment;

DETAILED DESCRIPTION OF THE EMBODIMENTS

Hereinafter, embodiments of the present invention will be described with reference to accompanying drawings.

First Embodiment

Figure 1:
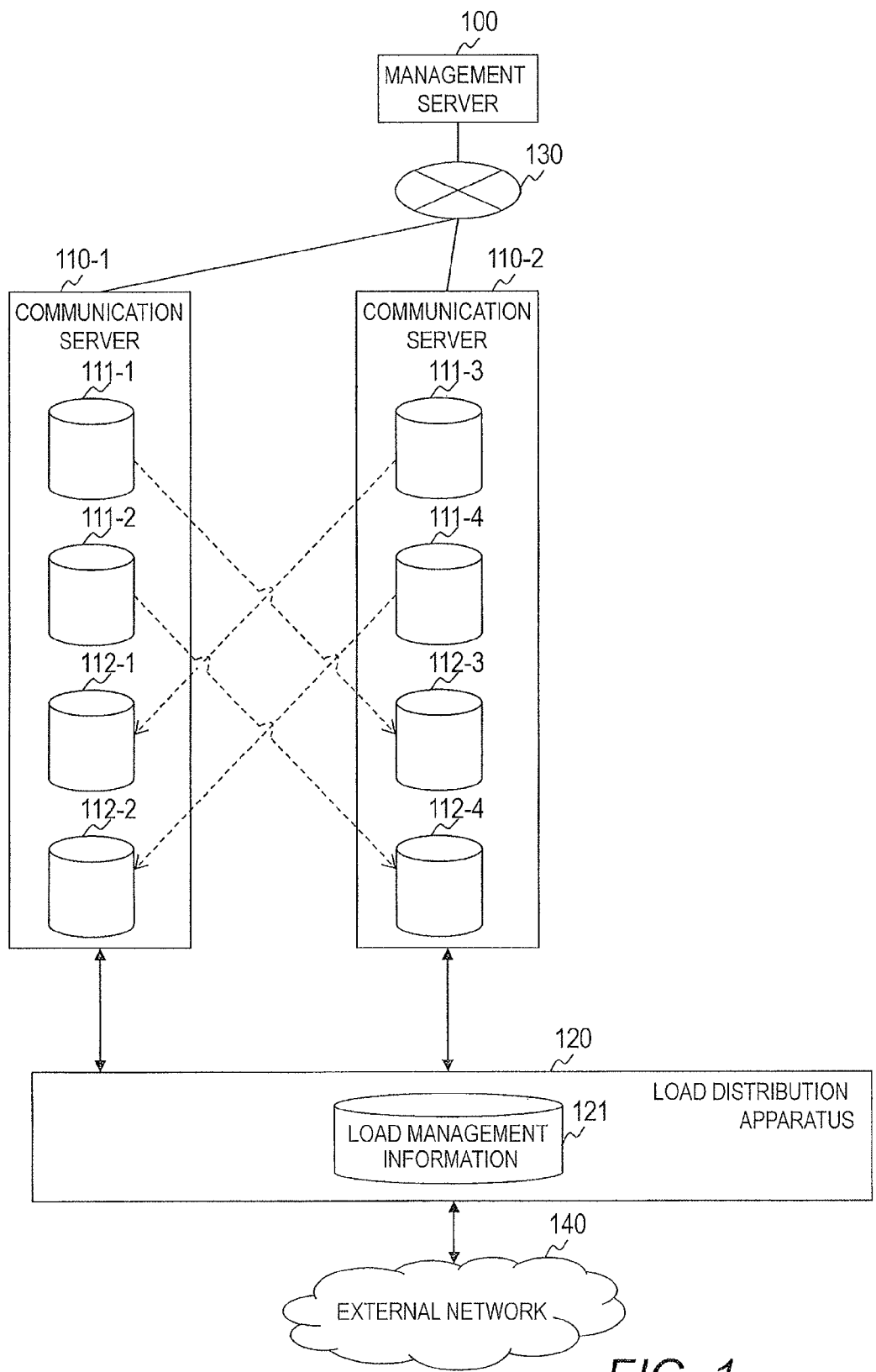
FIG. 1 is an explanatory drawing illustrating an example of a configuration of a communication system according to a first embodiment.
Figure 2:
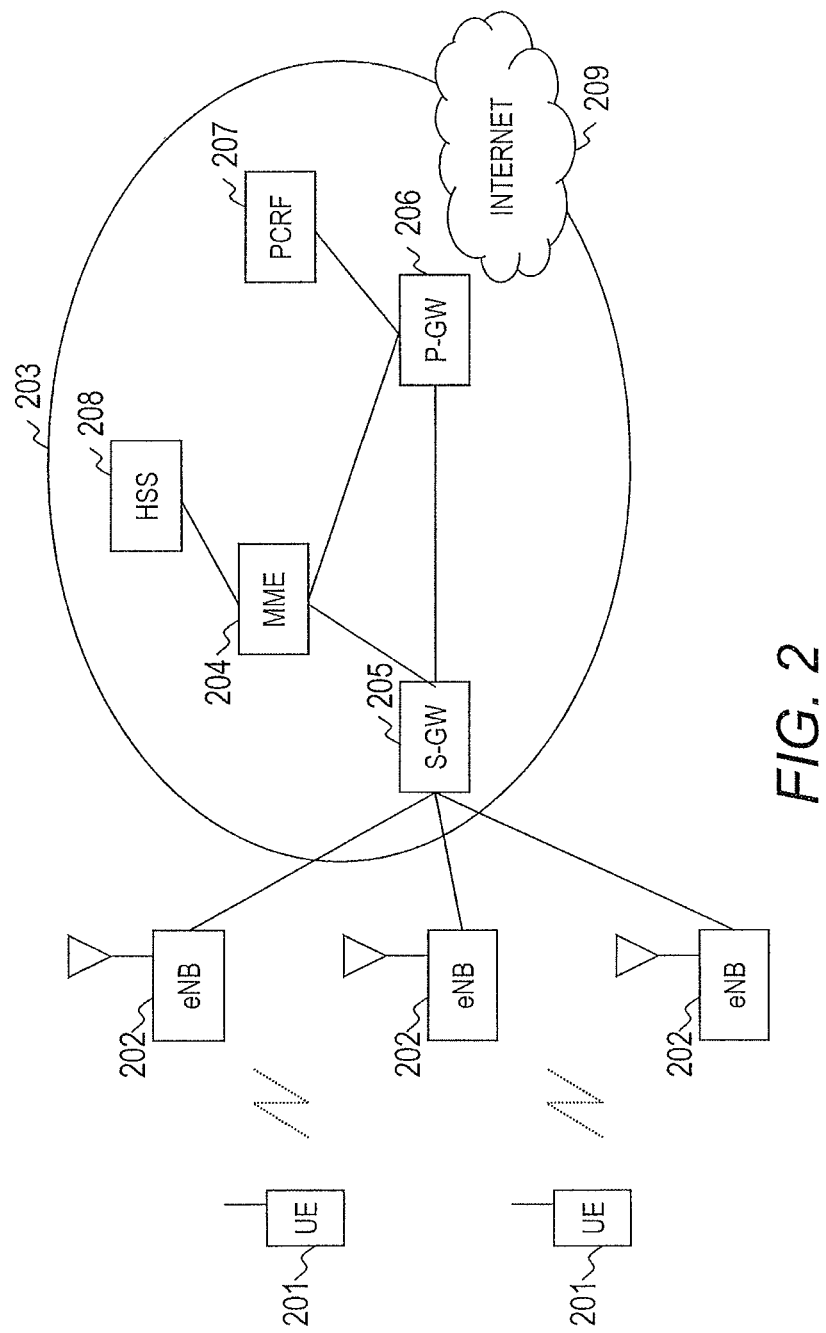
FIG. 2 is an explanatory drawing illustrating a specific example of a mobile communication system having applied thereon the communication system according to the first embodiment.

FIG. 1 is an explanatory drawing illustrating an example of a configuration of a communication system according to a first embodiment. FIG. 2 is an explanatory drawing illustrating a specific example of a mobile communication system applying thereon the communication system according to the first embodiment.

As illustrated in FIG. 1, the communication system includes a management server 100, a plurality of communication servers 110, and a load distribution apparatus 120. The management server 100 and the plurality of communication servers 110 are connected via a management network 130. Further, the load distribution apparatus 120 is connected with an external network 140. The load distribution apparatus 120 and the plurality of communication server 110 may be connected in a direct manner, or may be connected via a network such as LAN (Local Area Network), or the like.

Here, a mobile communication system applying the communication system illustrated in FIG. 1 will be described in detail with reference to FIG. 2. FIG. 2 illustrates the communication system illustrated in FIG. 1 applying an LTE.

A mobile terminal 201 connects a wireless link with a base station (eNB: enhanced Node B) 202. The base station 202 is connected with a wireless access network 203. Here, the communication server 110 corresponds with each server within the wireless access network 203. Note that the management server 100 may be arranged within the wireless access network 203 or at another network separate from the wireless access network 203.

The servers arranged within the wireless access network 203 include a Mobility Management Entity (MME) 204, a Serving Gateway (S-GW) 205, a Packet Data Network GW (P-GW) 206, a Policy Charging Rule Function (PCRF) 207, and an Home Subscriber Server (HSS) 208. Also, an Internet 209, which provides service to the mobile terminal 201, is connected with the wireless access network 203.

The MME 204 is configured to manage location information of the mobile terminal 201, and execute authentication of the mobile terminal 201. The S-GW 205 is a first mobile gateway configured to serve as an anchor point within the wireless access network 203. The P-GW 206 is a second mobile gateway configured to serve as a boundary between the internet 209 and the wireless access network 203. The PCRF 207 is configured to provide control information on QoS and charging information to the P-GW 206. The HSS 208 is configured to manage location registration database of the mobile terminal 201.

Note that the communication system illustrated in FIG. 1 is applicable to WiMAX system and 3G system besides LTE. For example, in a case where the communication system is applied to WiMAX system, the MME 204 and the S-GW 205 includes the features of an Access Service Network Gateway (ASN-GW), while a Home Agent (HA) includes the features of those of the P-GW 206. Also, in a case where the communication system is applied to 3G system, the MME 204 and the S-GW 205 includes the features of a Serving GPRS Support Node (SGSN), while Gateway GPRS Support Node (GGSN) includes the features of those of the P-GW 206.

Here, FIG. 1 shall be further elaborated.

The communication server 110 is configured to provide communication service to the mobile terminal 201. Note, in order to simplify the description, the communication system according to the first embodiment will assume the configuration having two communication servers: the communication server 110-1 and the communication server 110-2.

The communication server 110 includes a database 111 and a backup data 112. The database 111 is configured to store therein session information on the session of each the mobile terminal 201. Also, the backup data 112 is configured to include a copy of the database 111 stored by anther communication server 110. That is, the configuration according to the first embodiment session information is multiplexed.

It is to be noted that the configuration of the backup data 112 is not limited to what is described above. The configuration may be N-multiplexed, for example. In the N-multiplexed configuration, N units of the communication servers 110 store the same backup data 112. Further, the backup data of the database 111 of one unit of the communication server 110 may be divided and distributed to a plurality of communication servers 110. Furthermore, the configuration of the backup data 112 may include the combination of those described above.

According to the first embodiment, the communication server 110 stores the database 111 for each property of session information. The property of session information may, for example, include the state of a session, which includes an active state and an idle status.

The active status indicates that the mobile terminal 201 connects a wireless link with the base station 202 and is operable to communicate. That is, the active status indicates a status where a wireless resource is allocated to the mobile terminal 201. On the other hand, the idle status indicates a status where a wireless link with the base station 202 is cut off and the mobile terminal 201 is inoperable to communicate. That is, the idle status is a status where no wireless resource is allocated to the mobile terminal 201.

In the description herein a piece of the session information on a session in an active status will be referred to as first session information, and a piece of the session information on a session in an idle status will be referred to as second session information.

According to the first embodiment the communication server 110-1 and the communication server 110-2 each store the database 111 and the backup data 112 as stated below.

The communication server 110-1 stores a database 111-1 included in a plurality of pieces of the first session information, and a database 111-2 included in a plurality of pieces of the second session information. The communication server 110-1 further stores backup data 112-1 which is a copy of a database 111-3, and stores backup data 112-2 which is a copy of a database 111-4.

The communication server 110-2 stores the database 111-3 included in a plurality of pieces of the first session information, and the database 111-4 included in a plurality of pieces of the second session information. The communication server 110-2 further stores backup data 112-3 which is a copy of the database 111-1, and stores backup data 112-4 which is a copy of the database 111-2.

The load distribution apparatus 120, based on load management information 121, transfers a packet received from the external network 140 to a predetermined communication server 110. The details of the load management information 121 will be described below with reference to FIG. 5.

According to the first embodiment, all communication servers 110 are assumed to be active type and operate (ALL ACT), however, the present invention is not limited thereto. The present invention may include an ACT-STB configuration, or an M+N redundancy configuration in which communication servers 110 may be a standby type configured to store therein only backup data 112.

The management server 100 controls migration process of the communication server 110 and migration process of session information between communication servers 110.

During the migration process of the communication server 110, the management server 100 monitors the operation status of the communication server 110, and gives an instruction to scale out to add a new communication server 110 in a case where the load on the communication server 110 is high.

In the migration process of the session information, the management server 100 detects a migration trigger and moves a plurality of pieces of the session information from the communication server 110 of the migration source to the communication server 110 of the migration destination. Further, the management server 100 gives an update instruction in accordance with the migration of the plurality of pieces of the session information to the load distribution apparatus 120 to update the load management information 121.

Figure 3:
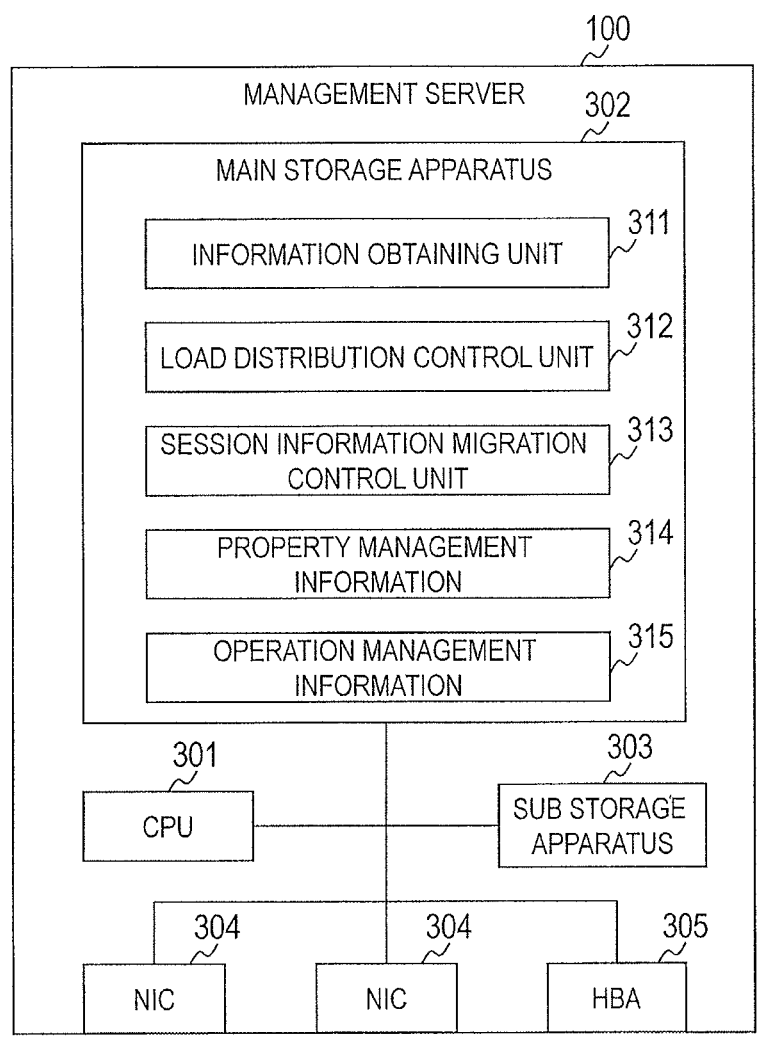
FIG. 3 is a block diagram illustrating an example of a hardware configuration and a software configuration of a management server according to the first embodiment.

Here, a configuration of the management server 100 will be described with reference to FIG. 3. FIG. 3 is a block diagram illustrating an example of a hardware configuration and a software configuration of the management server 100 according to the first embodiment.

The management server 100 includes as hardware a CPU 301, a main storage apparatus 302, a sub storage apparatus 303, a NIC 304, and a HBA 305. Note, the management server 100 may include an input/output apparatus such as a keyboard, a mouse, a touch panel, and/or a display.

The CPU 301 is configured to execute programs stored in the main storage apparatus 302. The CPU 301 executes a program the features of the management server 100 is realized.

The main storage apparatus 302 is a storage apparatus configured to store therein programs which is executed by the CPU 301 and information necessary for the execution of the programs. In the description below, when a functional unit is described as a subject of a particular sentence, it is implied that a program configured to implement said function unit is being executed. The main storage apparatus 302 may include a volatile storage apparatus such as DRAM, or the like. Note that the main storage apparatus 302 may include a non-volatile storage apparatus. The programs and information stored in the main storage apparatus 302 will be described below.

The sub storage apparatus 303 is a storage apparatus configured to store therein each type of program and each type of information. The sub storage apparatus 303 may include a non-volatile storage apparatus such as Flush memory, or the like. Note that the sub storage apparatus 303 may include a volatile storage apparatus.

In a case where the CPU 301 executes a process by using a predetermined program, the CPU 301 reads programs and information stored at the sub storage apparatus 303, and loads the retrieved programs and information to the main storage apparatus 302. Further, the CPU 301 executes the programs loaded to the main storage apparatus 302.

The NIC 304 is an interface configured to connect the management server 100 with another apparatus via a network such as WAN (Wide Area Network) or LAN, or the like. The HBA 305 is an interface configured to connect the management server 100 with an external storage system via a storage network such as SAN, or the like.

Here, the programs and information stored in the main storage apparatus 302 will be described. The main storage apparatus 302 according to the first embodiment stores therein programs to realize an information obtaining unit 311, a load distribution control unit 312, and a session information migration control unit 313, and further stores therein property management information 314 and operation management information 315.

The information obtaining unit 311 is configured to obtain information related to the session information managed by a communication control unit, and status information indicating the status of the communication server 110. Also, the information obtaining unit 311 stores therein information obtained by the property management information 314 and the operation management information 315.

To be more specific, the information obtaining unit 311 obtains from the communication server 110 information related to the session information managed by the communication control unit. Further, the information obtaining unit 311 obtains status information which includes information indicating the operation status of the communication server 110 obtained from the communication server 110, and the volume of packet transferred to the communication server 110 obtained from the load distribution apparatus 120 status. Note that the status information may further include information which indicates whether or not the communication servers 110 are operating normally, and information which indicates the change in configuration of the communication server 110 in the communication system, or the like.

The load distribution control unit 312 is configured to execute a load distribution process (i.e., scale out process, or the like) to distribute the load of the communication server 110, and a migration process of the communication server 110, or the like. The session information migration control unit 313 is configured to detect a migration trigger of the session information accompanying scale out, or the like, and move the session information from the communication server 110 of the migration source to the communication server 110 of the migration destination.

The property management information 314 is configured to store therein information used to manage the property of the session information managed by each communication sever 110. The property management information 314 will be described below in detail with reference to FIG. 6. The operation management information 315 is configured to store therein information used to manage the operation status of the communication servers 110. The operation management information 315 will be described below in detail with reference to FIG. 7.

The communication server 110 and the load distribution apparatus 120 according to the first embodiment may include the same hardware configuration as that of the management server 100. Note, however, the programs and information stored in the main storage apparatus 302 and the sub storage apparatus 303 are different from those stored at the management server 100.

The main storage apparatus 302 of the communication server 110 is configured to store therein programs configured to realize the communication control unit which controls the communication by the mobile terminal 201. The communication control unit is configured to accommodate a plurality of the mobile terminals 201, and control the communication which uses the session of each mobile terminal 201. Note that since the features of the communication control unit are well known in the art, detailed description thereof will be omitted.

The communication control unit manages the session information of the session of each mobile terminal 201. To be more specific, the communication control unit is configured to manage the database 111, in which the session information managed by said communication control unit, is stored, and the backup data 112, in which the session information managed by another communication control unit, is stored. The database 111 and the backup data 112 are stored in the sub storage apparatus 303 of the communication server 110. The details of the database 111 will be described below with reference to FIG. 4A and FIG. 4B.

Note that the database 111 and the backup data 112 may be stored in an external storage apparatus connected to the communication server 110 instead of at the sub storage apparatus 303.

The main storage apparatus 302 of the load distribution apparatus 120 stores therein programs configured to realize the features of the load distribution apparatus 120. Also, the sub storage apparatus 303 of the load distribution apparatus 120 stores therein the load management information 121.

Next, the information managed by the management server 100, the communication server 110, and the load distribution apparatus 120 will be described.

FIG. 4A and FIG. 4B are explanatory tables each illustrating an example of the database 111 stored in the communication server 110 according to the first embodiment. FIG. 4A illustrates an example of the database 111-1 configured to store therein a plurality of pieces of the first session information managed by the communication control unit of the communication server 110-1. FIG. 4B illustrates an example of the database 111-2 configured to store therein a plurality of pieces of the second session information managed by the communication control unit of the communication server 110-1.

The database 111-1 and the database 111-2 each include one entry for each session. In other words, one entry is arranged for each piece of session information.

The entry in the database 111-1 includes a session ID 401, an IMSI 402, a terminal address 403, a group number 404, a base station address 405, a base station port number 406, a base station tunnel ID 407, an own address 408, an own port number 409, and an own tunnel ID 410.

The session ID 401 is an identifier configured to uniquely identify session information (i.e., session). The IMSI 402 is an identifier of a Subscriber Identity Card (SIM) installed in the mobile terminal 201. The terminal address 403 is an IP address assigned to the mobile terminal 201. The group number 404 is a number configured to designate the property of the session information used when scale out is performed, or the communication server 110 at which the session information is backed up to make the session information redundant.

The base station address 405 is an IP address assigned to the base station 202 with which the mobile terminal 201 is communicating. The base station port number 406 is a port number of an L4 (TCP/UDP), or the like, which is used in a case where the base station 202 communicates with the communication server 110. The base station tunnel ID 407 is an identifier configured to identify a user or a tunnel in a case where a user packet is encapsulated by using an IP and transmitted.

The own address 408 is an IP address that is used by the communication server 110 in a case where packets are transmitted and received between the communication server 110 and the base station 202. The own port number 409 is a port number of an L4 (TCP/UDP), or the like, which is used by the communication server 110 in a case where packets are transmitted and received between the communication server 110 and the base station 202. The own tunnel ID 410 is an identifier configured to identify a user or a tunnel in a case where a user packet, which is encapsulated by using an IP, is received from the base station 202.

The entry stored in the database 111-2 includes a session ID 411, an IMSI 412, a terminal address 413, a group number 414, an own address 415, an own port number 416, and an own tunnel ID 417. During an idle status, in which the wireless link between the mobile terminal 201 and the base station 202 is disconnected, the second session information includes no base station address, base station port number, or base station tunnel ID.

Note that while the first session information and the second session information according to the first embodiment are managed as separate databases, they may be managed as a single database. When the first session information and the second session information are managed as a single database, a column to indicate whether the session status corresponding to a particular piece of session information is in an active status or in an idle status so as to manage in a unified manner multiple pieces of session information having different session statues.

FIG. 5 is an explanatory table illustrating an example of the load management information 121 stored in the load distribution apparatus 120 according to the first embodiment.

The load management information 121 includes one entry for each session (i.e., one piece of session information). The entry of the load management information 121 includes a session ID 501, a communication server ID 502, a communication server address 503, a terminal address 504, a transmission volume 505, and a reception volume 506.

The session ID 501 is an identifier configured to uniquely identify session information (i.e., session). The session ID 501 stores therein the information identical as that stored in the session ID 401. The communication server ID 502 is an identifier configured to uniquely identify the communication server 110. The communication server address 503 is a destination address used by the load distribution apparatus 120 in a case where the load distribution apparatus 120 transfers packets to the communication server 110. For example, the communication server address 503 may include a MAC address of the communication server 110, or an IP address dedicated for transferring packets from the load distribution apparatus 120 to the communication server 110. The terminal address 504 is an IP address assigned to the mobile terminal 201. The terminal address 504 stores therein the information identical as that stored at the terminal address 403.

The transmission volume 505 indicates the volume of data (i.e., packet) transmitted to the communication server 110 in the communication using the session corresponding to the session ID 501. For example, the transmission volume 505 is configured to store therein the number of packets or the volume of the packets transmitted to the communication server 110 within a certain period of time, or an integrated value of the number of packets or the volume of packets transmitted to the communication server 110 up until a given period. The reception volume 506 indicates the volume of data (i.e., packet) received from the communication server 110 in the communication using the session corresponding to the session ID 501. For example, the reception volume 506 is configured to store therein the number of packets or the volume of the packets received from the communication server 110 within a certain period of time, or an integrated value of the number of packets or the volume of packets received from the communication server 110 up until a given period.

FIG. 6 is an explanatory table illustrating an example of the property management information 314 stored in the management server 100 according to the first embodiment.

The property management information 314 is generated by the information obtaining unit 311. To be more specific, the information obtaining unit 311 obtains information related to the property of the session information from each communication server 110. The obtained information includes, at least, information related to the identifier of the communication server 110, the session ID, and the property of the session information.

The property management information 314 includes an entry for each communication server 110. The entry of the property management information 314 includes a communication server ID 601, a structure type 602, a session ID 603, and a property 604.

The communication server ID 601 is an identifier configured to uniquely identify the communication server 110. The communication server ID 601 stores therein the information identical as that stored at the communication server ID 502. The structure type 602 is information configured to indicate whether the communication server 110 is a physical server or a virtual server. To be more specific, in a case where the communication server 110 is a physical server, the structure type 602 stores "physical," and in a case where the communication server 110 is a virtual server, the structure type 602 stores "virtual."

The session ID 603 is an identifier configured to uniquely identify session information (i.e., session). The session ID 603 stores therein the information identical as that stored at the session ID 401. According to the first embodiment, the properties of all the session information managed by the communication server 110 are managed by using the property management information 314. Accordingly, the session ID 603 included in the entry of one communication server 110 includes the session ID of all the session information managed by said communication server 110.

The property 604 includes information configured to indicate the property of the session information. The property of the session information according to the first embodiment includes a status 605 and a data type 606.

The status 605 includes information configured to indicate whether the status of a session is active or idle. To be more specific, in a case where the session information is the first session information, the status 605 stores "Active," and in a case where the session information is the second session information, the status 605 stores "Idle."

The data type 606 includes information configured to indicate whether the session information is master or backup. To be more specific, in a case where the session information is master, the data type 606 stores "master," and in a case where the session information is backup, the data type 606 stores "backup."

Here, the master session information indicates that said information is session information managed by the communication control unit as master information. That is, the master session information is the session information to be stored in the database 111. Whereas the backup session information indicates that said information is a copy of the session information managed by another communication control unit as master information. That is, the backup session information is the session information to be stored in the backup data 112.

As illustrated in FIG. 6, the property management information 314 stores therein only the information related to the property of session information rather than the session information itself. Note, however, that the property management information 314 may store therein session information itself, too.

Also, the property 604 may include an additional column to store therein the priority which sets as the session corresponding to the session information. The column in which the priority is stored may include a value which indicates the quality of a communication, for example.

FIG. 7 is an explanatory table illustrating an example of the operation management information 315 stored in the management server 100 according to the first embodiment.

The operation management information 315 includes an entry for each physical server. The entry of the operation management information 315 includes a physical server ID 701, a CPU usage rate 702, a memory usage rate 703, a number of user accommodated 704, a process data volume 705, and a communication volume 706.

The physical server ID 701 is an identifier configured to uniquely identify the physical server. According to the first embodiment, in which one physical server corresponds with one communication server 110, the physical server ID stores therein the information identical as that stored in the communication server ID 502.

The CPU usage rate 702 indicates the usage rate of the CPU included in the communication server 110. The memory usage rate 703 indicates the usage rate of the memory included in the communication server 110. Note that memory usage may be used instead of the memory usage rate 703. The number of user accommodated 704 indicates the number of mobile terminals 201 accommodated at the communication server 110.

The process data volume 705 indicates the volume of the data (i.e., packet) processed by the communication server 110. The process data volume 705 is configured to store therein the number of packets or the volume of the packets processed within a certain period of time, or an integrated value of the number of packets or the volume of the packet processed up until a given period. The communication volume 706 indicates the volume of the data (i.e., packet) transferred to the communication server 110 by the load distribution apparatus 120. The communication volume 706 is configured to include the number of packets or the volume of the packet transferred to the communication server 110 within a certain period of time, an integrated value of the number of packets or the volume of the packet transferred to the communication server 110 up until a given period, the number of packets or the volume of the packet transmitted to the load distribution apparatus 120 by the communication server 110 within a certain period of time, or an integrated value of the number of packets or the volume of the packet transmitted to the load distribution apparatus 120 up until a given period.

Next, a process by the communication system according to the first embodiment will be described.

Figure 8:
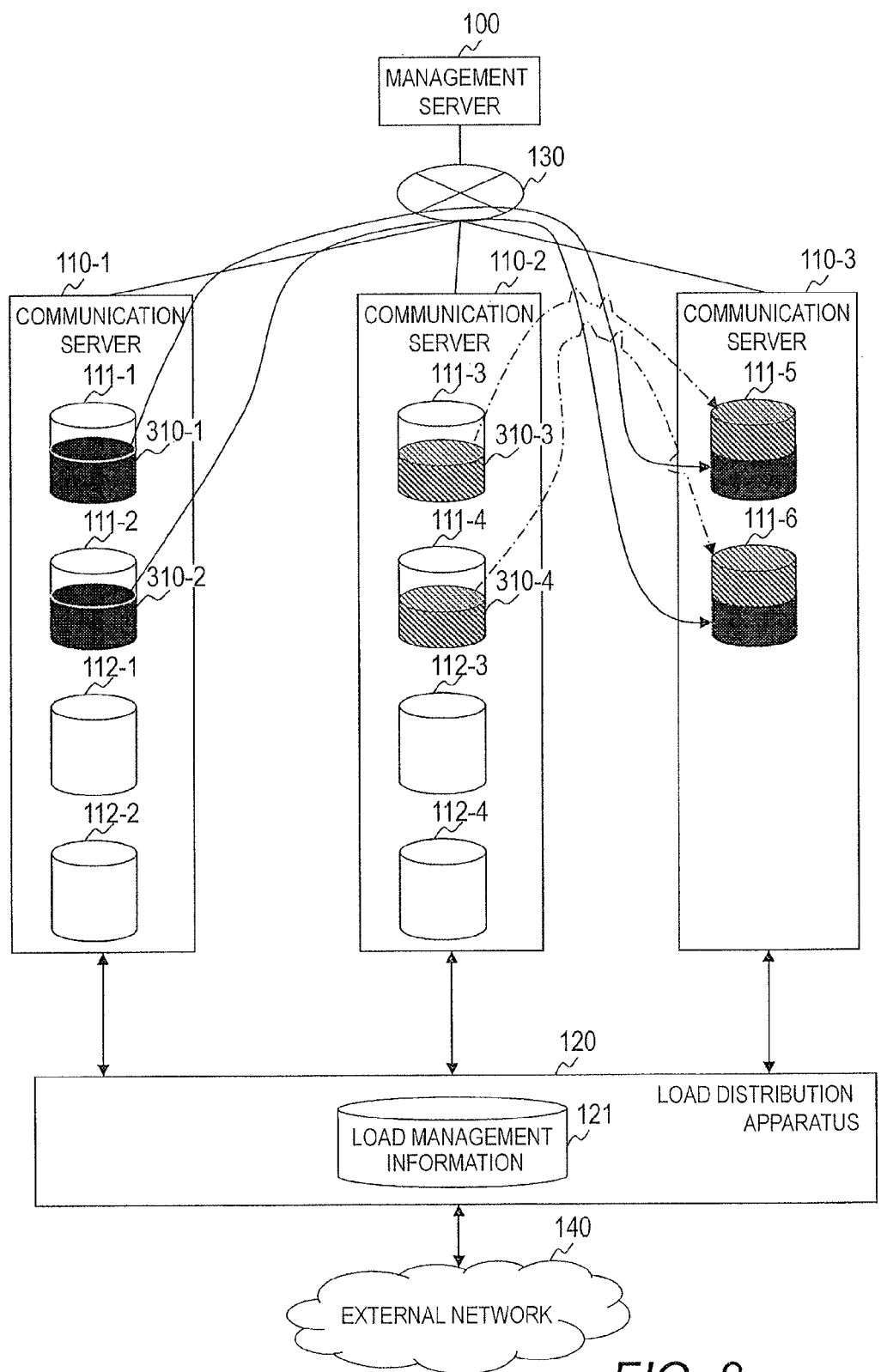
FIG. 8 is an explanatory diagram illustrating an example of a configuration of the communication system after a load distribution process according to the first embodiment is executed.
Figure 9:
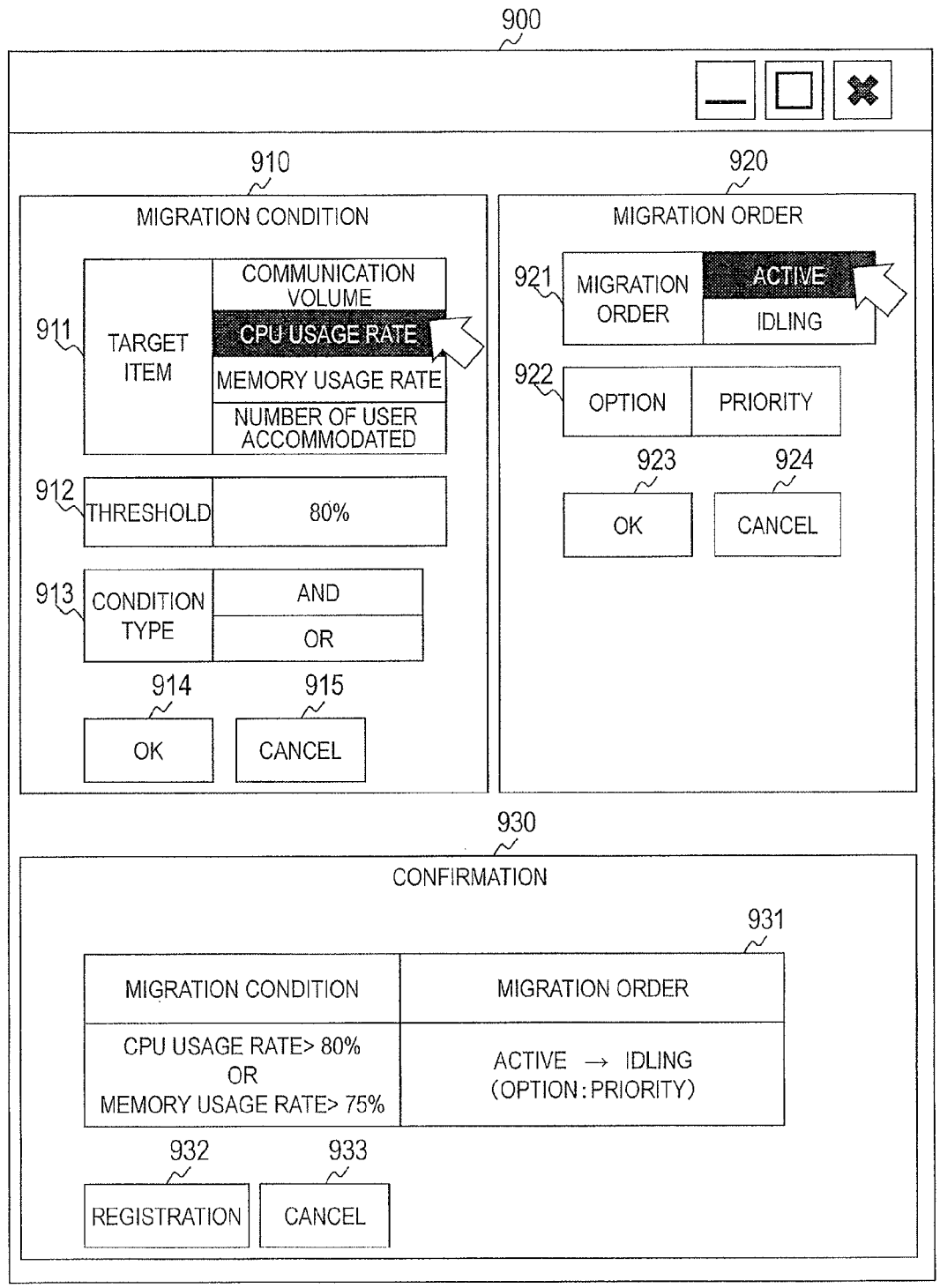
FIG. 9 is an explanatory diagram illustrating an example of a user interface configured to set migration condition information necessary for a migration process of session information executed by the management server according to the first embodiment.

FIG. 8 is an explanatory diagram illustrating an example of a configuration of the communication system after the load distribution process according to the first embodiment is executed. FIG. 9 is an explanatory diagram illustrating an example of a user interface configured to set migration condition information necessary for the migration process of the session information executed by the management server 100 according to the first embodiment.

It is assumed in the first embodiment, as illustrated in FIG. 8, that the load distribution process (i.e., scale out) will be executed in which a communication server 110-3 will be newly added, in order to distribute increased load imposed on the communication server 110-1 and the communication server 110-2.

At this point, in accompanying the load distribution process the management server 100 moves a portion of the plurality of the first session information stored in the database 111-1 to the database 111-5, and moves a portion of the plurality of the second session information stored in the database 111-2 to the database 111-6. Further, in accompanying the load distribution process the management server 100 moves a portion of the plurality of the first session information stored in the database 111-3 to the database 111-5, and moves a portion of the plurality of the second session information stored in the database 111-4 to the database 111-6.

A user interface 900, which is illustrated in FIG. 9, is used to set migration condition information for the migration process of the session information. Here, the user interface 900 will be described.

The user interface 900 includes a migration condition input area 910, a migration order input area 920, and a confirmation area 930.

The migration condition input area 910 is an input area configured to set migration conditions for detecting a migration trigger of the session information. According to the first embodiment, conditions to start the load distribution process are set as the conditions to move the session information. The migration condition input area 910 includes a target item 911, a threshold 912, a condition type 913, an OK button 914, and a cancel button 915.

The target item 911 is an input area configured to set an item to be monitored in order to determine whether to move session information (i.e., scale out) or not. According to the first embodiment, the target item 911 already includes selectable items to be monitored from which selections will be made. In the example illustrated in FIG. 9, "CPU usage rate" is selected as an item to be monitored.

The threshold 912 is an input area configured to set a threshold for the item to be monitored. According to the first embodiment, the threshold 912 includes an upper limit set therein. That is, in a case where the value of the item to be monitored is greater than the threshold 912, it is determined that the session information will be moved.

The condition type 913 is an input area configured to set a correlation among a plurality of items to be monitored. According to the first embodiment, the condition type 913 includes "AND" and "OR." In a case where the condition type 913 includes "AND," it is determined that the session information will be moved in a case where all the monitored items exceed the threshold. Further, in a case where the condition type 913 includes "OR," it is determined that the session information will be moved in a case where any one of the plurality of monitored items exceeds the threshold.

The OK button 914 is an operation button configured to set the value set for the target item 911, the value set for the threshold 912, and/or the value set for the condition type 913 as the condition to migration information. The cancel button 915 is an operation button configured to cancel the value set for the target item 911, the value set for the threshold 912, and/or the value set for the condition type 913.

The migration order input area 920 is an input area configured to set a migration order which is an order of migration of a plurality of pieces of the session information. The migration order input area 920 includes a migration order 921, an option 922, and OK button, and a cancel button 924.

The migration order 921 is an input area configured to select which session information (i.e., the first session information and the second session information) to move first. According to the first embodiment, the management server 100 first moves the session information whose session status corresponds to the session status as selected in the migration order 921 from the communication server 110 of the migration source to another communication server of the migration destination.

The option 922 is an input area configured to set an additional condition with which the migration order is determined for the migration process involving a plurality of pieces of the session information. For example, the option 922 includes an indicator for selecting the session information which will be moved. According to the example illustrated in FIG. 9, priority of the session that corresponds to the session information is used as the indicator. Note that the option 922 does not necessarily need to include therein a value of an object.

The OK button 923 is an operation button configured to set the value set for the migration order 921 and/or the value set for the option 922 as the condition for the migration order for the session information. The cancel button 924 is an operation button configured to cancel the value set for the migration order 921 and the value set for the option 922.

Note that the migration order input area 920 may include an input area for setting the communication server 110 at the destination of the migration of information. The migration order input area 920 may further include an input area for setting the number of pieces of session information to be moved, an interval between the transmissions of the session information, or a timing in which the transmissions of the sessions are executed, or the like.

The confirmation area 930 is an input area configured to confirm the values set in the migration condition input area 910 and the values set in the migration order input area 920.

The confirmation area 930 includes a display area 931, a registration button 932, and a cancel button 933.

The display area 931 is an area configured to display the combination of the migration condition and the migration order. The registration button 932 is an operation button configured to register at the management server 100 the combination that is displayed at the display area 931 as the migration condition information. The cancel button 933 is an operation button configured to cancel the registration of the migration condition displayed at the display area 931.

The operator who manages the management server 100 uses the user interface 900 to set the migration order for a plurality of pieces of the session information so as to reduce down time for the communication that uses the session which corresponds to the session information, and to have the effect of the migration of the session information reflected on the communication system in a swift manner.

Note that the user interface 900 illustrated in FIG. 9 is merely an example thereof and may include other features for setting the information similar to that described above.

Figure 10A:
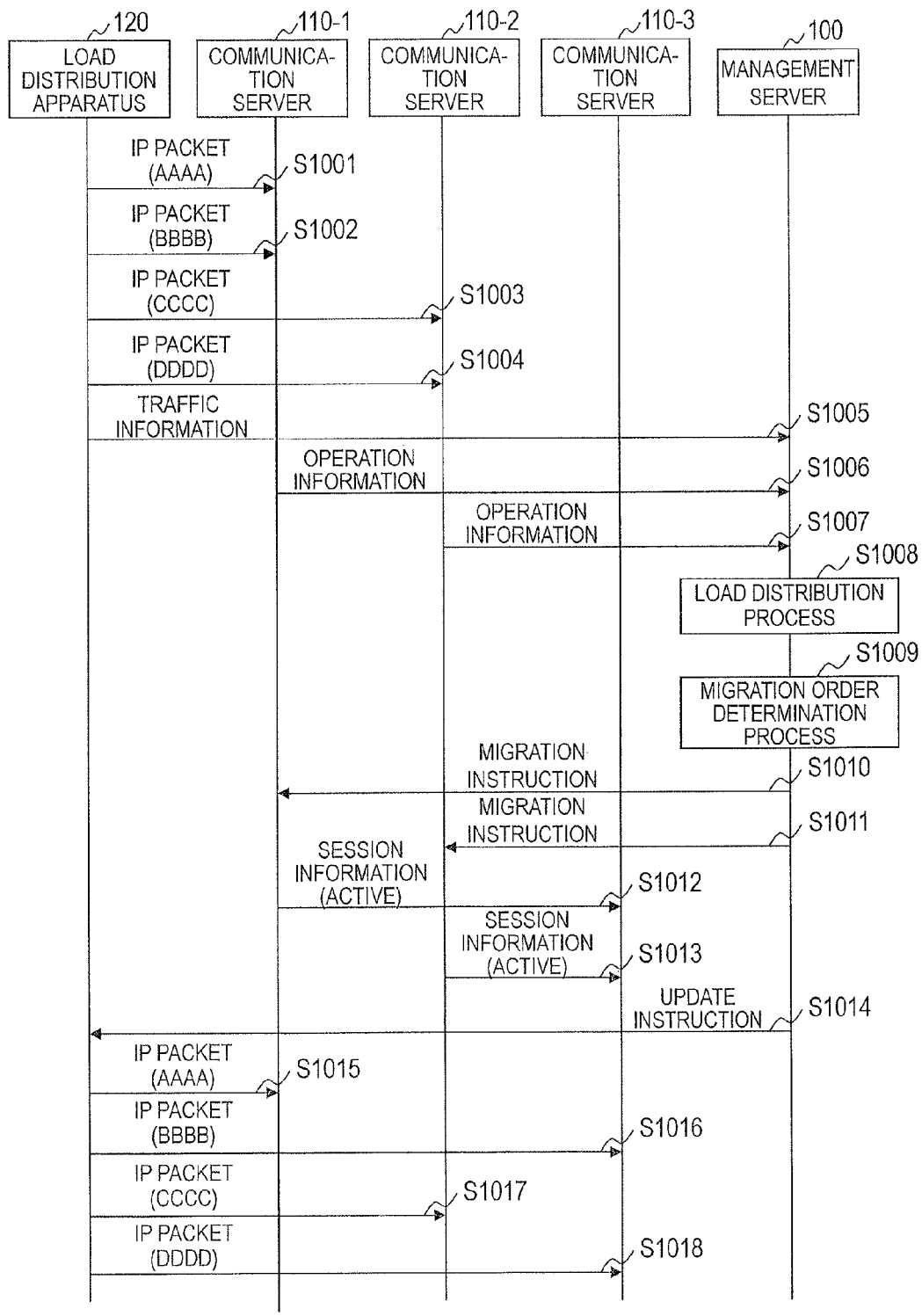
FIG. 10A and FIG. 10B are sequence diagrams each describing a flow of processes by the communication system according to the first embodiment.
Figure 10B:
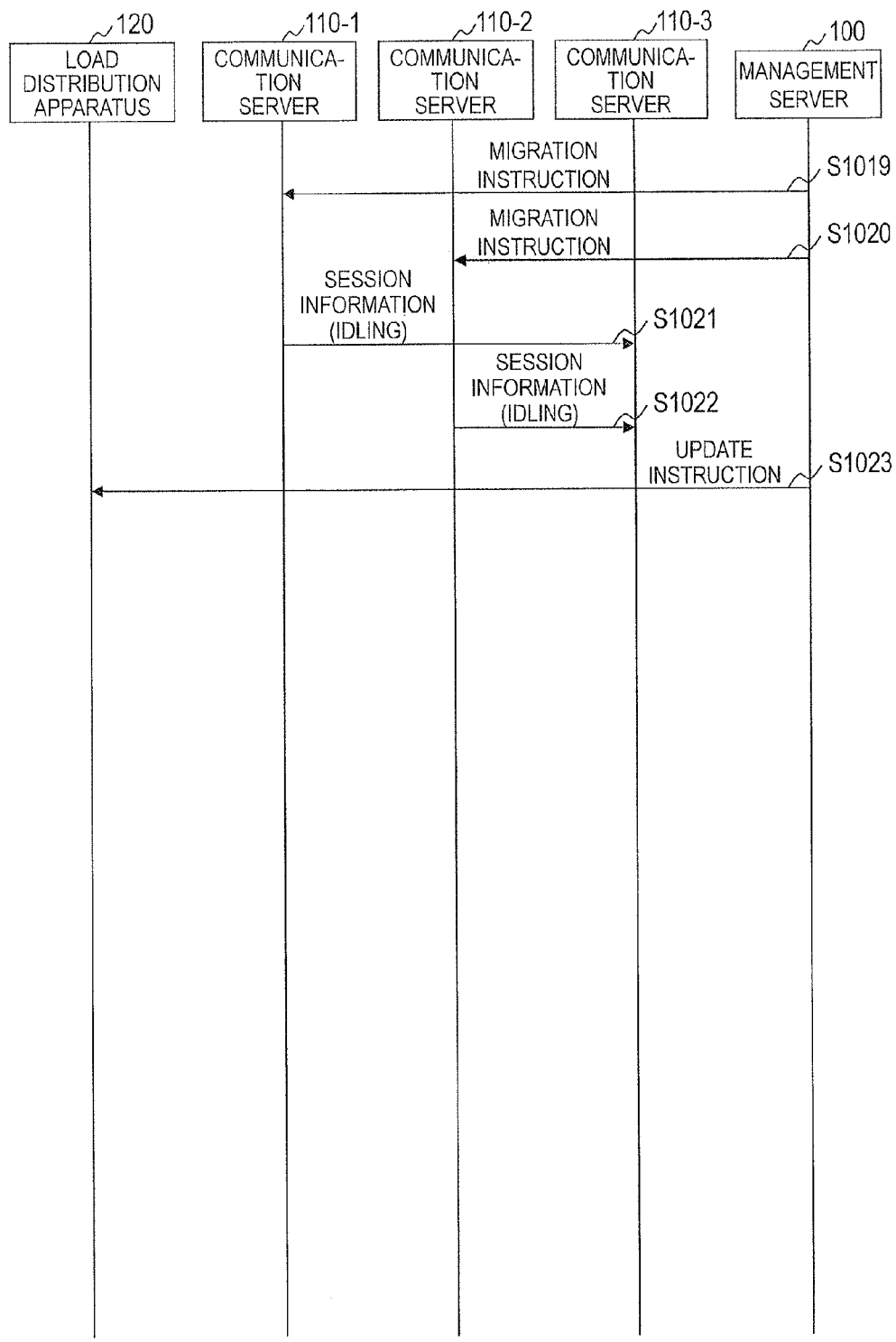

FIG. 10A and FIG. 10B are sequence diagrams each describing the flow of processes by the communication system according to the first embodiment.

Prior to the execution of the load distribution process, the load distribution apparatus 120 transmits to the communication server 110-1 the IP packet for a communication that uses a session whose session ID is "AAAA" and the IP packet for a communication that uses a session whose session ID is "BBBB" (Step S1001, Step S1002).

Further, the load distribution apparatus 120 transmits to the communication server 110-2 the IP packet for a communication that uses a session whose session ID is "CCCC" and the IP packet for a communication that uses a session whose session ID is "DDDD" (Step S1003, Step S1004).

The management server 100 obtains traffic information from the load distribution apparatus 120 in a periodic manner (Step S1005).

To be more specific, the information obtaining unit 311 transmits an obtaining request for traffic information to the load distribution apparatus 120. The load distribution apparatus 120 transmits the information stored in the load management information 121 as the traffic information, in a case of receiving the obtaining request. Note that the timing at which the traffic information is obtained may be set voluntarily by the operator of the management server 100. Further, the load distribution apparatus 120 may transmit the traffic information to the information obtaining unit 311 in a periodic manner.

The management server 100 obtains operation information from each of the communication server 110-1 and the communication server 110-2 in a periodic manner (Step S1006, Step S1007).

To be more specific, the information obtaining unit 311 transmits an obtaining request for operation information to the communication server 110-1 and the communication server 110-2. The communication server 110-1 and the communication server 110-2 each transmit the identifier, CPU usage rate, the memory usage rate, the number of users accommodated, and the volume of the processed packets, or the like, as the operation information to the information obtaining unit 311, in a case of receiving the obtaining request. Note that the timing at which the operation information is obtained may be set voluntarily by the operator of the management server 100. Further, the communication server 110 may transmit the operation information to the information obtaining unit 311 in a periodic manner.

The management server 100 determines whether to scale out or not. According to the first embodiment, in which the condition to start the load distribution process corresponds to the condition to move the session information, the management server 100 determines whether or not to scale out based on the migration condition information and the operation management information 315.

Here, it is assumed the management server 100 determines to perform scale out, in which case, the management server 100 performs the load distribution process (Step S1008). In the load distribution process according to the first embodiment the load distribution control unit 312 adds the communication server 110-3 to the communication system, and starts the communication server 110-3.

According to the first embodiment, the management server 100 detects the execution of the load distribution process as the migration trigger of the session information. Accordingly, after the completion of the load distribution process, the management server 100 starts the migration process of the session information. In the migration process of the session information, the management server 100 first executes a migration order determination process (Step S1009).

In the migration order determination process, the session information migration control unit 313 selects a plurality of pieces of the session information which will be moved to the newly added communication server 110-3, and determines the order the selected plurality of pieces of the session information. The selected plurality of pieces of the session information include at least one piece of the first session information and at least one piece of the second session information.

Here, it is assumed that the session information whose session ID is "BBBB" and the session information whose session ID is "DDDD" are selected as the first session information which will be moved to the newly added communication server 110-3. Also, as for the migration order, it is assumed that the migration will be performed in the order of the first session information, and then the second session information.

Note, the process executed by the management server 100 will be described below with reference to FIG. 11A, FIG. 11B, and FIG. 12.

The management server 100 transmits a migration instruction to the communication server 110-1 to move the first session information (Step S1010). Further, the management server 100 transmits a migration instruction to the communication server 110-2 to move the first session information (Step S1011).

To be more specific, the session information migration control unit 313 transmits to the communication server 110-1 the migration instruction requesting the first session information whose session ID is "BBBB" to be moved. Further, the session information migration control unit 313 transmits to the communication server 110-2 the migration instruction requesting the first session information whose session ID is "DDDD" to be moved.

The communication server 110-1 transmits the selected first session information (i.e., the session information whose session ID is "BBBB") to the communication server 110-3 (Step S1012), in a case of receiving the migration instruction. Further, the communication server 110-2 transmits the selected first session information (i.e., the session information whose session ID is "DDDD") to the communication server 110-3 (Step S1013), in a case of receiving the migration instruction.

The communication server 110-3 stores the first session information received from the communication server 110-1 and the first session information received from the communication server 110-2 in the database 111-5.

The communication server 110 transmits to the load distribution apparatus 120 an update instruction requesting the load distribution apparatus 120 to update the load management information 121 (Step S1014), in a case where the migration of the first session information is completed. The update instruction includes the session ID of the session information which is targeted to be updated, the identifier of the communication server 110 at the destination of the migration, and the address of the communication server 110 at the destination of the migration.

At this point, the load distribution apparatus 120 updates the load management information 121 in accordance with the update instruction. To be more specific, following processes will be executed.

Firstly, the load distribution apparatus 120 obtains from the received update instruction the session ID, the identifier of the communication server 110 of the migration destination, and the address of the communication server 110 of the migration destination. The load distribution apparatus 120 searches for an entry in which the session ID 501 corresponds to the obtained session ID. The load distribution apparatus 120 sets the identifier of the communication server 110 of the obtained migration destination to the communication server ID 502 of the retrieved entry, and sets the address of the communication server 110 of the obtained migration destination to the communication server address 503 of the retrieved entry. Further, the load distribution apparatus 120 initializes the values for the transmission volume 505 and the reception volume 506.

After the process described above, the newly added communication server 110-3 is configured to manage the communication utilizing the session which corresponds to the moved first session information. In other words, the load distribution apparatus 120 transmits to the communication server 110-1 the IP packet of the communication using the session whose session ID is "AAAA" (Step S1015), and transmits to the communication server 110-3 the IP packet of the communication using the session whose session ID is "BBBB" (Step S1016). Further, the load distribution apparatus 120 transmits to the communication server 110-2 the IP packet of the communication using the session whose session ID is "CCCC" (Step S1017), and transmits to the communication server 110-3 the IP packet of the communication using the session whose session ID is "DDDD" (Step S1018).

The management server 100 transmits to the communication server 110-1 and the communication server 110-2 the migration instruction requesting each of them to move the second session information (Step S1019, Step S1020). The migration instruction includes the session ID of at least one piece of the second session information selected by the management server 100.

The communication server 110-1 transmits to the communication server 110-3 the second session information that corresponds to the session ID included in the migration instruction out of the plurality of pieces of the second session information stored in the database 111-2 (Step S1021), in a case of receiving the migration instruction.

The communication server 110-2 transmits to the communication server 110-3 the second session information that corresponds to the session ID included in the migration instruction out of the plurality of pieces of the second session information stored in the database 111-4 (Step S1022), in a case of receiving the migration instruction.

The communication server 110-3 stores the plurality of pieces of the second session information received from the communication server 110-1 and the second session information received from the communication server 110-2 in the database 111-6.

The management server 100, after the migration of the second session information is completed, transmits to the load distribution apparatus 120 the update instruction requesting the load distribution apparatus 120 to update the load management information 121 (Step S1023). By this, the migration process of the session information is completed.

The load distribution apparatus 120 updates the load management information 121 in accordance with the update instruction. Note that the method to update the load management information 121 is the same as that described with Step S1014, and the description thereof will be omitted.

Next, the process executed by the management server 100 will be described below in detail.

Figure 11A:
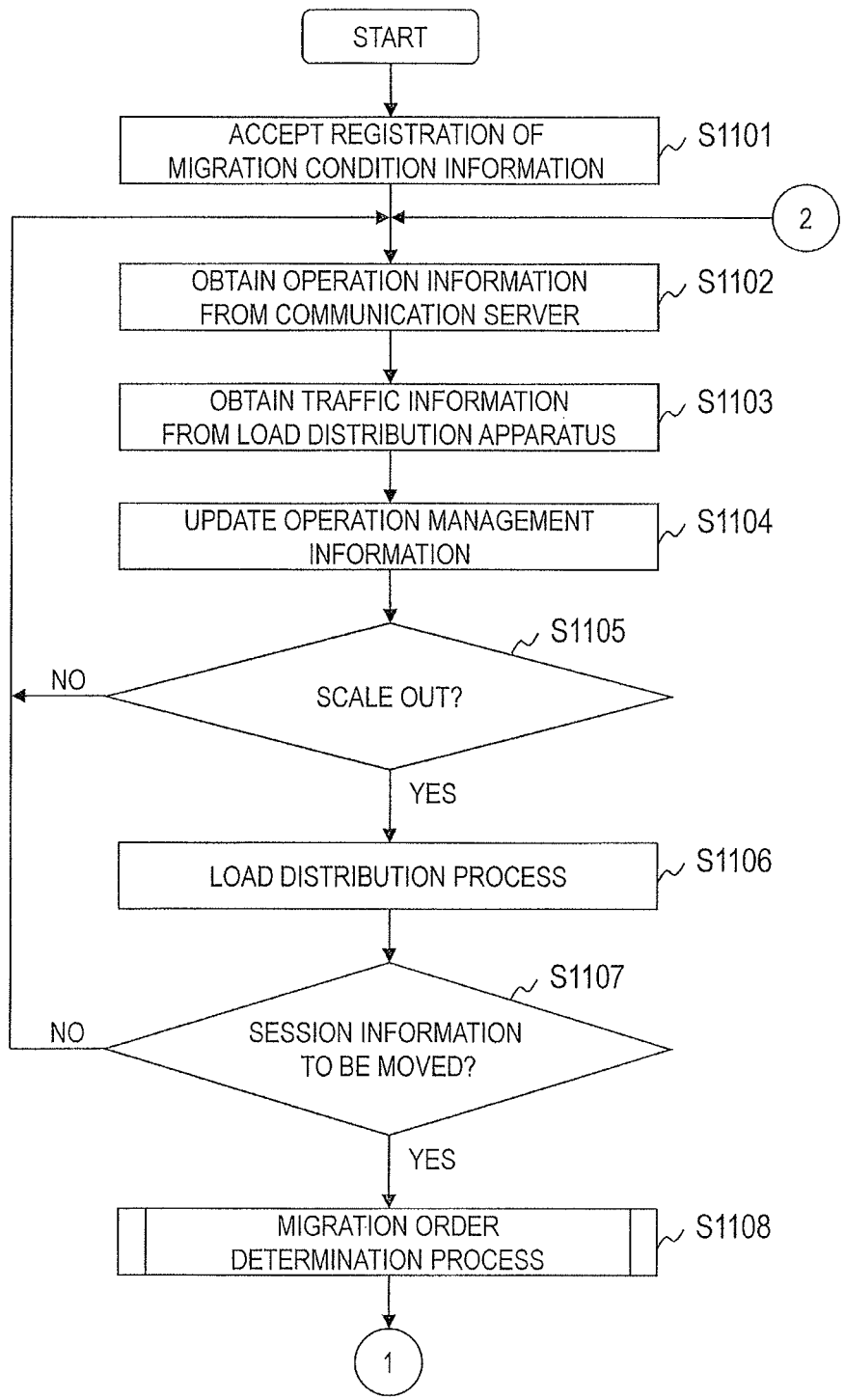
FIG. 11A and FIG. 11B are flowcharts each describing the outline of a process executed by the management server according to the first embodiment.
Figure 11B:
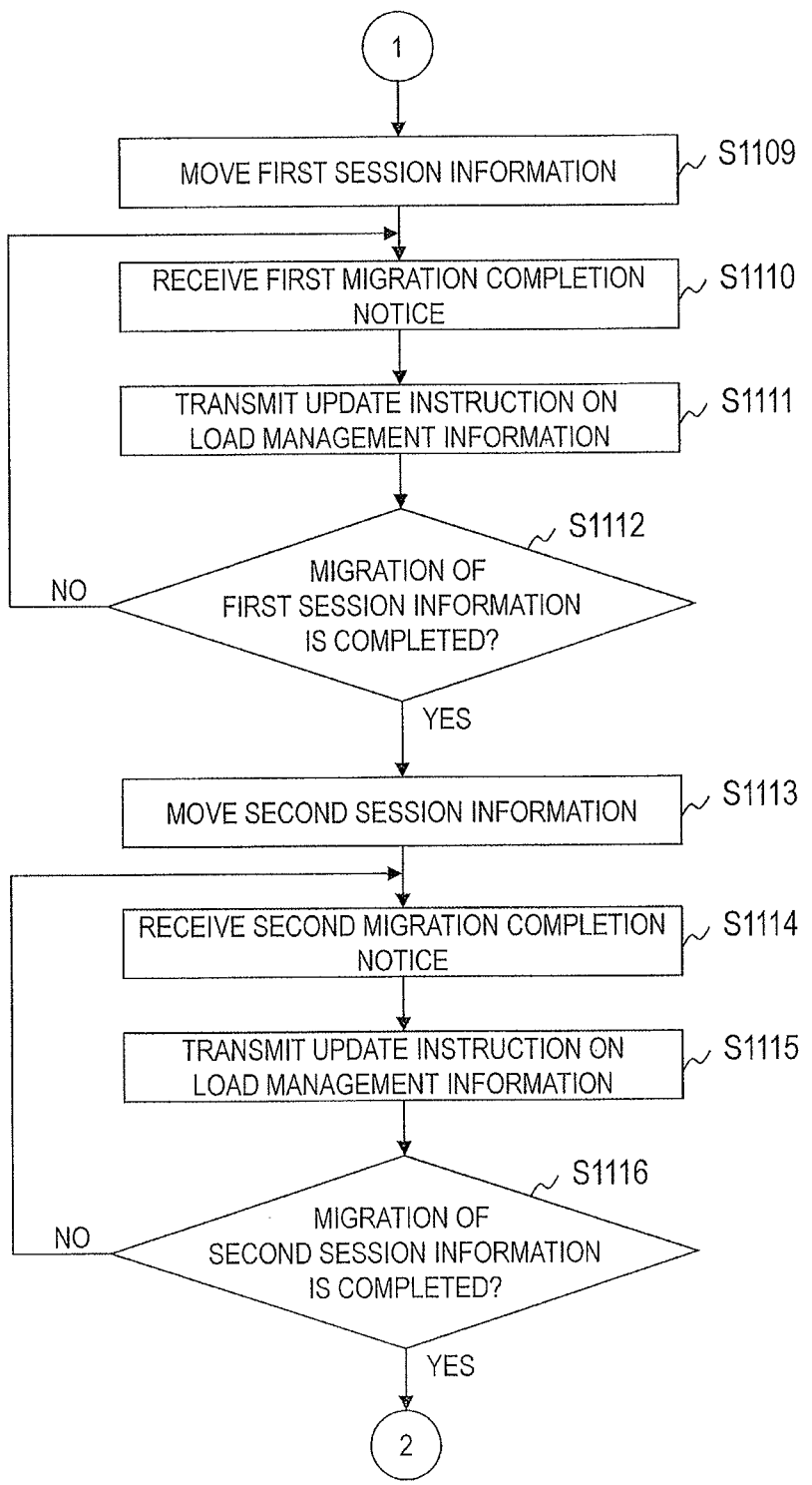

FIG. 11A and FIG. 11B are flowcharts each describing the outline of the process executed by the management server 100 according to the first embodiment.

The management server 100 accepts the registration of the migration condition information (Step S1101). The management server 100 stores the migration condition information at the main storage apparatus 302 or the sub storage apparatus 303. Note that the migration condition information may be stored in the management server 100 in advance.

The management server 100 obtains the operation information from each of the plurality of communication servers 110 (Step S1102). Further, the management server 100 obtains the traffic information from the load distribution apparatus 120 (Step S1103).

To be more specific, the information obtaining unit 311 obtains the operation information from each of the plurality of communication servers 110, and obtains the traffic information from the load distribution apparatus 120.

The management server 100 updates the operation management information 315 based on the operation information obtained from each of the plurality of communication servers 110 and the traffic information obtained from the load distribution apparatus 120 (Step S1104). To be more specific, following processes will be executed.

The information obtaining unit 311 selects one piece of the operation information out of the plurality of pieces of the obtained operation information, and searches for an entry in which the physical server ID 701 corresponds to the identifier of the communication server 110 included in said operation information. The information obtaining unit 311 overwrites the CPU usage rate 702, the memory usage rate 703, the number of user accommodated 704, and the process data volume 705 of the retrieved entry with the value included in the operation information. The management server 100 executes the above stated process in a repeated manner with respect to the plurality of piece of the obtained operation information.

The information obtaining unit 311 selects an entry from the traffic information (i.e., load management information 121). The information obtaining unit 311 searches for an entry in which the physical server ID 701 corresponds to the communication server ID 502 of the selected entry. The information obtaining unit 311 overwrites the communication volume 706 of the retrieved entry with the value stored in the reception volume 506. The information obtaining unit 311 executes the above stated process in a repeated manner with respect to all the entries included in the traffic information.

Note that the communication volume 706 may be set the value stored in the transmission volume 505, or each of the value stored in the transmission volume 505 and the value stored at the reception volume 506.

The above is the description of the process in Step S1104.

Next, the management server 100 determines whether or not to scale out based on the migration condition information and the operation management information 315 (Step S1105).

To be more specific, the load distribution control unit 312 determines whether or not to scale out based on the migration condition information and the operation management information 315.

For example, in a case where the migration condition information which is displayed in the confirmation area 930 in FIG. 9 is already set, the load distribution control unit 312 refers to the CPU usage rate 702 and the memory usage rate 703 of the operation management information 315 so as to determine whether or not there is a communication server 110 whose CPU usage rate is greater than 80%, or a communication server 110 whose memory usage rate is greater than 75%.

In a case where there is at least one communication server 110 that meets the above stated condition, the load distribution control unit 312 determines that scale out will be performed.

In a case where it is determined that scale out will not be performed, the management server 100 returns to Step S1102, and executes the same process in said Step.

In a case where it is determined that scale out will be performed, the management server 100 executes the load distribution process (Step S1106).

To be more specific, the load distribution control unit 312 adds a new communication server 110 to the communication system, and activates the new communication server 110. Note that since the load distribution process that is well known in the art may be used herein, the process will not be described in detail in the present document.

According to the first embodiment the communication server 110 that is newly added to the communication system is the destination of the migration of the session information. Accordingly, the load distribution control unit 312 output the identification information of said communication server 110 such as the identifier and the address, or the like, of the communication server 110 of the migration destination to the session information migration control unit 313.

The management server 100, after the completion of the load distribution process, determines whether or not to move the session information based on the migration condition information and the operation management information (Step S1107). The process executed in Step S1107 is a process for detecting the migration trigger of the session information.

To be more specific, the session information migration control unit 313 determines whether or not to move the session information based on the migration condition information and the operation management information. According to the first embodiment, in which the condition to start the load distribution process corresponds to the condition to move the session information, the determination result of Step S1105 may be used as is.

In a case where it is determined that the session information is not moved, the management server 100 returns to Step S1102, and executes the same process in said Step.

In a case where it is determined that the session information is moved, the management server 100 executes the migration order determination process based on the migration condition information and the property management information 314 (Step S1108).

To be more specific, the session information migration control unit 313 selects a plurality of pieces of the session information which will be moved out of the plurality of pieces of the session information stored in the database 111 included in the communication server 110 of the migration source. Further, the session information migration control unit 313 determines the order the plurality of pieces of the selected session information. The details of the migration order determination process will be described below with reference to FIG. 12.

The management server 100 moves at least one piece of the first session information from the communication server 110 of the migration source to the communication server 110 of the migration destination (Step S1109).

To be more specific, the session information migration control unit 313 transmits the migration instruction requesting the communication server 110 of the migration source to move at least one piece of the first session information selected in Step S1108. The migration instruction includes the session ID of the at least one piece of the selected first session information, the identifier of the communication server 110 of the migration destination, and the address of the communication server 110 of the migration destination.

In a case of receiving the migration instruction from the management server 100, the communication server 110 of the migration source reads out at least one piece of the first session information from the database 111, and transmits the at least one piece of the first session information to the communication server 110 of the migration destination in accordance with the migration instruction. The communication server 110 of the migration source, after the completion of the migration of the first session information, transmits a first migration completion notice to the management server 100. Note that the communication server 110 of the migration destination may transmit the first migration completion notice.

The communication server 110 of the migration destination stores the at least one piece of the received first session information in the database 111. Further, the communication server 110 of the migration destination starts the communication process using the session which corresponds to the moved first session information.

In a case of receiving the first migration completion notice from the communication server 110 of the migration source (Step S1110), the management server 100 transmits to the load distribution apparatus 120 the update instruction for updating the load management information 121 (Step S1111).

To be more specific, the session information migration control unit 313 transmits to the load distribution apparatus 120 the update instruction which includes the session ID of the at least one piece of the moved first session information, the identifier of the communication server 110 of the migration destination, and the address of the communication server 110 of the migration destination.

The management server 100 determines whether or not the migration of the first session information is completed (Step S1112).

To be more specific, the session information migration control unit 313 determines whether or not the first migration completion notice is received from all the communication servers 110 to which the migration instruction was transmitted. In a case where the first migration completion notice is received from all the communication servers 110 to which the migration instruction was transmitted, the session information migration control unit 313 determines the migration of the first session information is completed.

In a case where it is determined that the migration of the first session information is not yet completed, the management server 100 returns to Step S1110, and executes the same process in said Step.

In a case where it is determined that the migration of the first session information is completed, the management server 100 moves at least one piece of the second session information from the communication server 110 of the migration source to the communication server 110 of the migration destination (Step S1113).

To be more specific, the session information migration control unit 313 transmits the migration instruction requesting the communication server 110 of the migration source to move at least one piece of the second session information selected in Step S1108. The migration instruction includes the session ID of the at least one piece of the selected second session information, the identifier of the communication server 110 of the migration destination, and the address of the communication server 110 of the migration destination.

In a case of receiving the migration instruction from the management server 100, the communication server 110 of the migration source reads out at least one piece of the second session information from the database 111, and transmits the at least one piece of the second session information to the communication server 110 of the migration destination in accordance with the migration instruction. The communication server 110 of the migration source, after the completion of the migration of the second session information, transmits a second migration completion notice to the management server 100.

In a case of receiving the second migration completion notice from the communication server 110 of the migration source (Step S1114), the management server 100 transmits to the load distribution apparatus 120 the update instruction for updating the load management information 121 (Step S1115).

To be more specific, the session information migration control unit 313 transmits to the load distribution apparatus 120 the update instruction which includes the session ID of the at least one piece of the moved second session information, the identifier of the communication server 110 of the migration destination, and the address of the communication server 110 of the migration destination.

The management server 100 determines whether or not the migration of the second session information is completed (Step S1116).

To be more specific, the session information migration control unit 313 determines whether or not the second migration completion notice is received from all the communication servers 110 to which the migration instruction was transmitted. In a case where the second migration completion notice is received from all the communication servers 110 to which the migration instruction was transmitted, the session information migration control unit 313 determines the migration of the second session information is completed.

In a case where it is determined that the migration of the second session information is not yet completed, the management server 100 returns to Step S1114, and executes the same process in said Step.

In a case where it is determined that the migration of the second session information is completed, the management server 100 returns to Step S1102, and executes the same process in said Step.

Note that while it is set in the first embodiment that the migration condition of the session information corresponds to the condition to start the load distribution process, the present invention is not limited thereto. The migration condition of the session information may differ from the condition to start the load distribution process. When the migration condition of the session information is set differently from the condition to start the load distribution process, the management server 100, after executing the process of Step S1104, determines whether or not to move the session information based on the migration condition information and the operation management information 315 (Step S1107). That is, the processes in Step S1105 and Step S1106 will be omitted.

Figure 12:
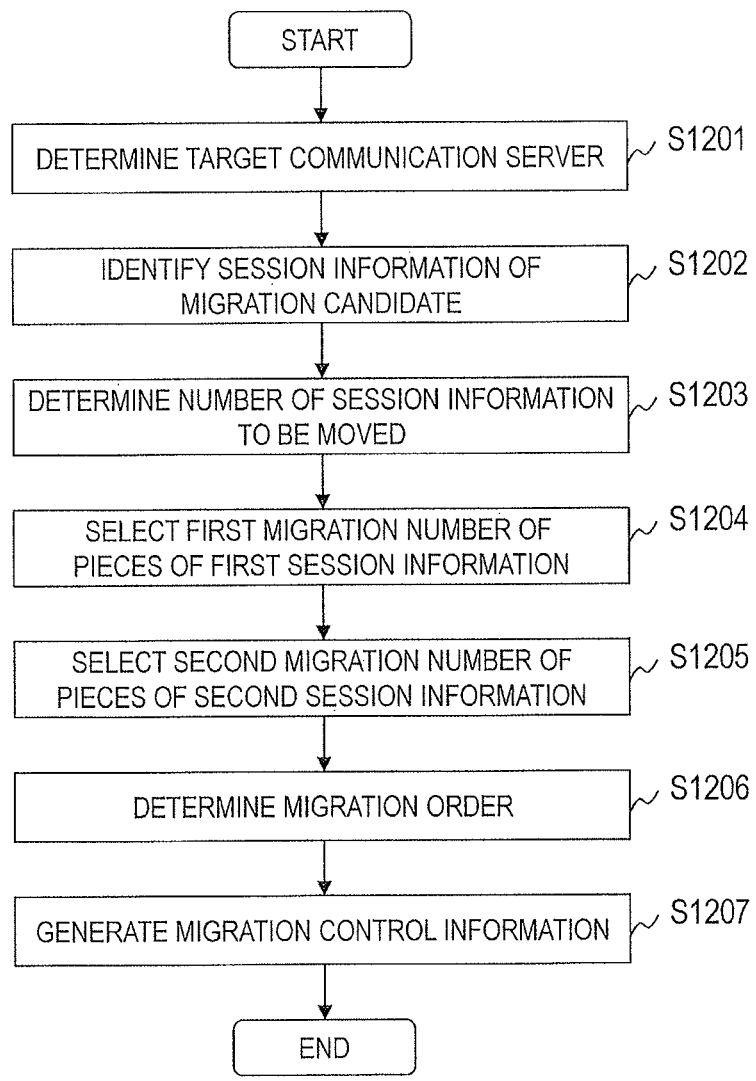
FIG. 12 is a flowchart for describing an example of a migration order determination process executed by a session information migration control unit of the management server according to the first embodiment.

FIG. 12 is a flowchart for describing an example of the migration order determination process executed by the session information migration control unit 313 of the management server 100 according to the first embodiment.

The session information migration control unit 313 determines a target communication server 110 (Step S1201). In other words, the session information migration control unit 313 determines the communication server 110 of the migration source of the session information.

To be more specific, the session information migration control unit 313 determines the communication server 110 of the migration source based on the process result of the load distribution process outputted from the load distribution control unit 312. Note that in a case where the condition to move the session information differs from the condition to start the load distribution process, the session information migration control unit 313 determines the communication server 110 that satisfies the migration condition set in the migration condition information as the communication server 110 to be object.

The session information migration control unit 313 specifies a plurality of pieces of the session information as the candidate session information to be moved from a plurality of pieces of the session information stored in the database 1111 included in the target communication server 110 based on the property management information 314 (Step S1202).

To be more specific, the session information migration control unit 313 refers to the property management information 314 so as to search for an entry in which the communication server ID 601 corresponds to the identifier of the target communication server 110. The session information migration control unit 313 refers to the property 604 of the retrieved entry so as to specify the session information whose data type 606 includes "Master" as the candidate session information to be moved.

The session information migration control unit 313 determines the number of pieces of the first session information to be moved and the number of pieces of the second session information to be moved (Step S1203).

There are various methods to determine the number of pieces of the session information to be moved. For example, the session information migration control unit 313 determines the number of pieces of the first session information to be moved in a manner such that the number of pieces of the first session information stored in the database 111 of the communication server 110 of the migration source and the number of pieces of the first session information stored in the database 111 of the communication server 110 of the migration destination are equal. The session information migration control unit 313 may use the same method as the above to determine the number of pieces of the second session information to be moved. In the description hereinbelow the number of pieces of the first session information to be moved will be referred to as a first migration number, and the number of pieces of the second session information to be moved will be referred to as a second migration number.

Note, the determination method described above is merely an example, and the present invention is not limited thereto. Another determination method described below may be used, for example.

(1) The session information migration control unit 313 determines the first migration number and the second migration number based on the performance of the communication server 110 of the migration source and the performance of the communication server 110 of the migration destination. In this case, the session information migration control unit 313 calculates a value for the performance of the communication server 110 by using a technology well known in the art, and determines the first migration number and the second migration number based on a ratio of the performance value of the communication server 110 of the migration source and the performance value of the communication server 110 of the migration destination.

(2) In a case where the number of pieces of the session information to be moved is already included in the migration condition information, the session information migration control unit 313 determines the first migration number and the second migration number based on the number included in the migration condition information.

The above is the description of the process in Step S1203.

Next, the session information migration control unit 313 selects the first migration number of pieces of the first session information from the plurality of pieces of the first session information as the candidate session information to be moved (Step S1204).

In the first embodiment, it is assumed that the session information migration control unit 313 selects the first migration number of pieces of the first session information in order starting from the entry at the top of the database 111.

Note that the selection method of the first session information is not limited to that described above. In a case where the migration condition information includes the information concerning selecting session information in accordance with the priority of each session, the session information migration control unit 313 selects the first migration number of pieces of the first session information in the order of priority of the sessions from high to low.

The session information migration control unit 313 selects the second migration number of pieces of the second session information from the plurality of pieces of the second session information as the candidate session information to be moved (Step S1205). The process executed in Step S1205 is the same as that executed in Step 1204.

The session information migration control unit 313 determines the order the plurality of pieces of the selected first session information and the plurality of pieces of the selected second session information based on the migration condition information (Step S1206).

In the first embodiment, it is assumed that the session information migration control unit 313 determines to transmit (move) the plurality of pieces of the session information in the order of the plurality of pieces of the first session information and then the plurality of pieces of the second session information.

The session information migration control unit 313 generates migration control information based on the process result (Step S1207). Then, the session information migration control unit 313 ends the process.

To be more specific, the session information migration control unit 313 generates the migration control information which includes the identification information of the communication server 110 of the migration source, the identification information of the communication server 110 of the migration destination, the session ID of the selected first session information, the session ID of the selected second session information, and an order of the migration. The identification information of the communication server 110 may include an identifier and/or an address of the communication server 110.

The migration control information may include a timing at which the second session information is transmitted. The communication server 110 of the migration destination, after receiving the first session information, starts the communication process using said first session information. Transmitting a large number of the plurality of pieces of the second session information to the communication server 110 of the migration destination may not allow the bandwidth usable for the communication process to be secured. Accordingly, in order to secure the bandwidth, a transmission timing may be set in advance.

The session information migration control unit 313, after the completion of the migration order determination process, transmits the migration instruction of the selected session information to the communication server 110 of the migration source based on the migration control information. Note that the session information migration control unit 313 may transmit the generated migration control information to an apparatus other than the communication server 110 of the migration source such as the load distribution apparatus 120. When the generated migration control information is transmitted to an apparatus other than the communication server 110, said apparatus controls the migration of the plurality of pieces of the session information based on the migration control information.

According to the first embodiment, it becomes possible to determine the order the plurality of pieces of the session information is moved from the communication server 110 of the migration source to the communication server 110 of the migration destination based on the property of the session information.

To be more specific, first the management server 100 moves the first session information stored in the database 111 included in the communication server 110-1 and the database 111 included in the communication server 110-2 to the communication server 110-3, and instructs, after the completion of the migration of the first session information, the load distribution apparatus 120 to update the load management information 121. Accordingly, the communication server 110-3 is operable to execute the process for the communication using the session corresponding to the first session information after the load management information 121 is updated.

Meanwhile, the communication using the session corresponding to the second session information is not yet conducted, the communication by the mobile terminal 201 will not be affected even if the second session information is not immediately to be moved to the communication server 110-3. Accordingly, the management server 100, after the migration of the first session information, instructs the communication server 110 of the migration source to move the second session information at a predetermined timing.

Accordingly, it becomes possible to swiftly reflect the effect of the load distribution due to scale out. Also, it becomes possible to reduce down time of a service associated with scale out.

Note that while it is assumed in the description of the first embodiment that the condition to move the session information corresponds to the condition to start the load distribution process, the present invention is not limited thereto. An occurrence of a failure may be the condition to move the session information. By this, it becomes possible to reduce the down time of the service associated with a failure occurrence, and reduce the amount of time required to reconfigure a redundant configuration.

Second Embodiment

A second embodiment is different from the first embodiment in that the communication server 110 to which the migration instruction of the second session information is transmitted is different from that in the first embodiment. To be more specific, the management server 100 transmits the migration instruction of the second session information to the communication server 110 that includes the backup data 112, which is a copy of the database 111 included in the communication server 110 of the migration source. Hereinafter, the second embodiment will be described by focusing on differences between the first embodiment and the second embodiment.

Figure 13:
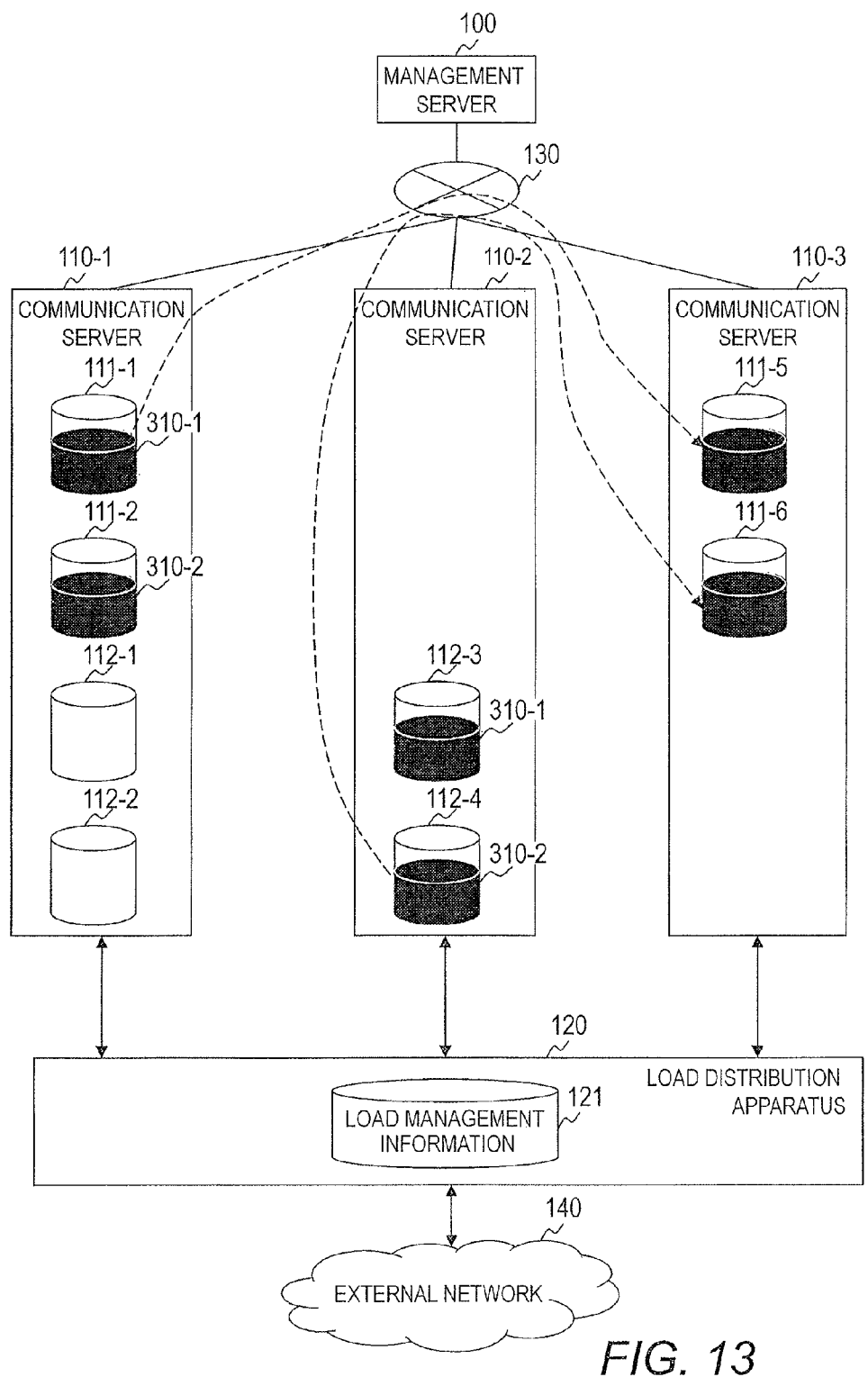
FIG. 13 is an explanatory drawing illustrating an example of a configuration of the communication system according to a second embodiment.

FIG. 13 is an explanatory drawing illustrating an example of a configuration of the communication system according to the second embodiment.

In the second embodiment it is assumed that the session information managed at the communication control unit of the communication server 110-1 will be moved to the communication server 110-3. Further, it is also assumed that the communication server 110-2 is a standby server configured to include only the backup data 112-3 and the backup data 112-4, which are the copy of the database 111-1 and the database 111-2, respectively.

In the second embodiment the standby communication server 110-2 is configured as the communication server 110 of the migration source for the second session information. The communication server 110-2 transmits the second migration number of the pieces of the second session information from the backup data 112-4, which is the copy of the database 111-2 included in the communication server 110-1, in a case of receiving the migration instruction from the management server 100.

Note that since the configuration of the management server 100 and that of the communication server 110 are the same as those already described in the first embodiment, the description thereof will be omitted. Also, since each type of information used in the second embodiment is the same as each type of information used in the first embodiment, the description thereof will be omitted.

Figure 14:
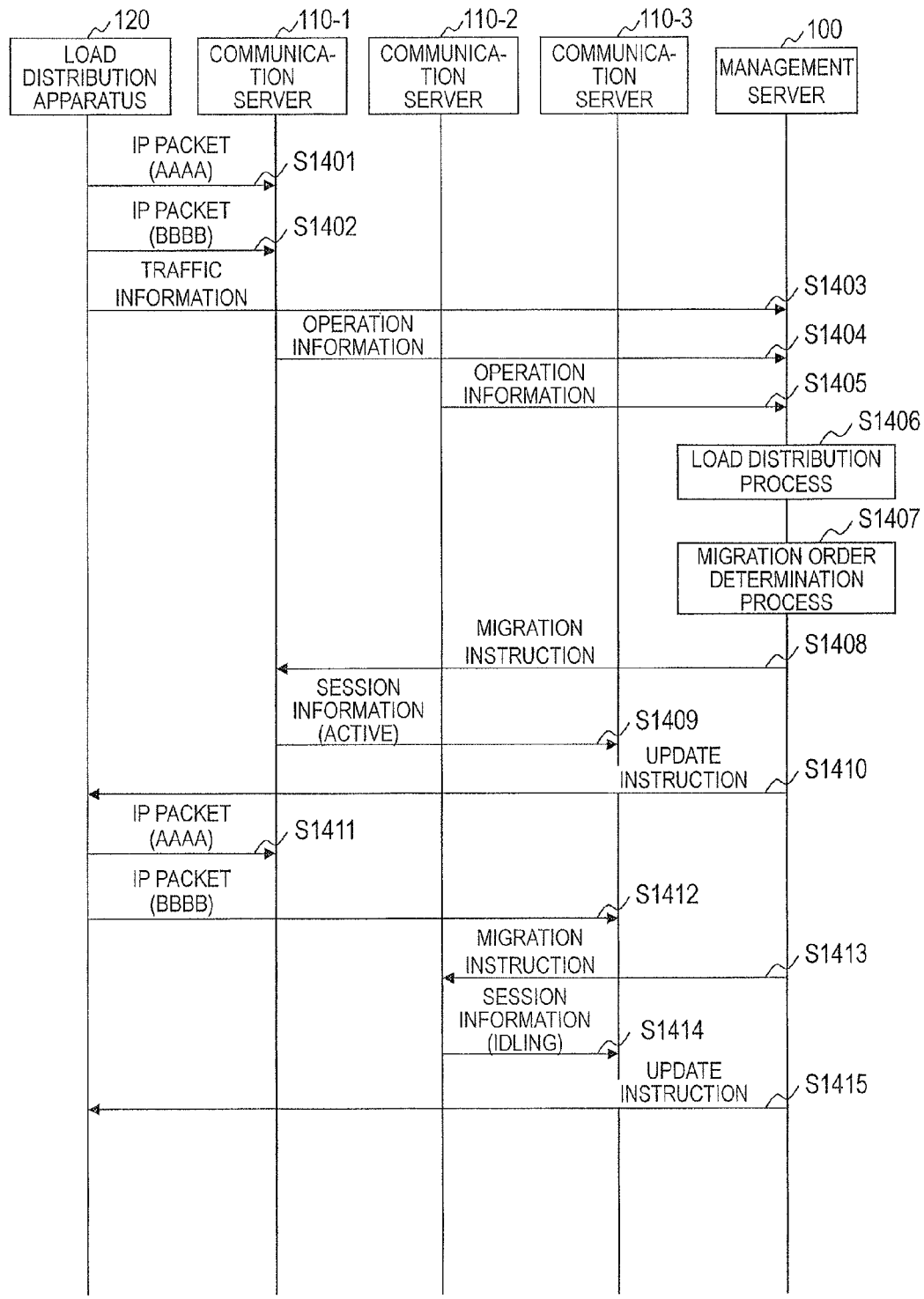
FIG. 14 is a sequence diagram describing a flow of processes by the communication system according to the second embodiment.

FIG. 14 is a sequence diagram describing the flow of processes by the communication system according to the second embodiment.

Note that the processes executed in Step S1401 through Step S1402 are the same those executed in Step S1001 through Step S1002. The processes executed in Step S1403 through Step S1408 are the same those executed in Step S1005 through Step S1010. The process executed in Step S1409 is the same as that executed in Step S1012. The processes executed in Step S1410 through Step S1412 are the same those executed in Step S1014 through Step S1016. Also, the process executed in Step S1415 is the same that executed in Step S1023.

In the second embodiment, the management server 100, after the completion of the migration of the first session information, transmits the migration instruction of the second session information to the communication server 110-2

(Step S1413). The information included in the migration instruction is the same as that described in the first embodiment.

The communication server 110-2 reads out and transmits the second migration number of the pieces of the second session information from the backup data 112-4 which is the copy of the database 111-2 to the communication server 110-3, in a case of receiving the migration instruction (Step S1414).

In the second embodiment, the migration condition information is configured to include information concerning moving the plurality of pieces of the second session information from the backup data 112. Also, the process details of the migration order determination process according to the second embodiment are partially different from those according to the first embodiment.

Note that the processes executed in Step S1201 through Step S1204 are the same as those in the first embodiment. Also, the process executed in Step S1206 is the same as that in the first embodiment. Note, however, that the process details of Step S1205 according to the second embodiment is partially different from those according to the first embodiment.

The session information migration control unit 313 selects the second migration number of pieces of the second session information in order starting from the entry at the top of the database 111.

The session information migration control unit 313 refers to the property management information 314 so as to search for the communication server 110 includes the backup data 112. The searched backup data 112 includes session information whose session ID 603 corresponds to the session ID of the selected session information, and whose data type 606 is "backup." That is, the session information migration control unit 313 searches for the communication server 110 that includes the backup data 112 which is the copy of the database 111.

The session information migration control unit 313 determines the retrieved communication server 110 as the communication server 110 of the migration source of the second session information. In a case where multiple communication servers 110 that match the criteria stated above are retrieved, the session information migration control unit 313 selects the standby communication server 110 in a prioritized manner.

The above is the description of the process in Step S1205 according to the second embodiment.

Note that Step S1207 according to the second embodiment includes a process partially different from the first embodiment. To be more specific, the session information migration control unit 313 generates the migration control information which includes the identification information of the communication server 110 of the migration source of the first session information, the identification information of the communication server 110 of the migration source of the second session information, the identification information of the communication server 110 of the migration destination, the session ID of the selected first session information, the session ID of the selected second session information, and an order of the migration.

After the process described above, the management server 100 is operable in Step S1413 to transmit the migration instruction of the second session information to the communication server 110-2.

By virtue of the configuration according to the second embodiment, it becomes possible to reduce the load imposed on the communication server 110 of the migration source of the first session information since the standby communication server 110 moves the second session information.

Third Embodiment

A third embodiment is different from the first embodiment in that the communication server 110 is realized by using a virtual server. Hereinafter, the third embodiment will be described by focusing on differences between the first embodiment and the third embodiment.

Figure 15:
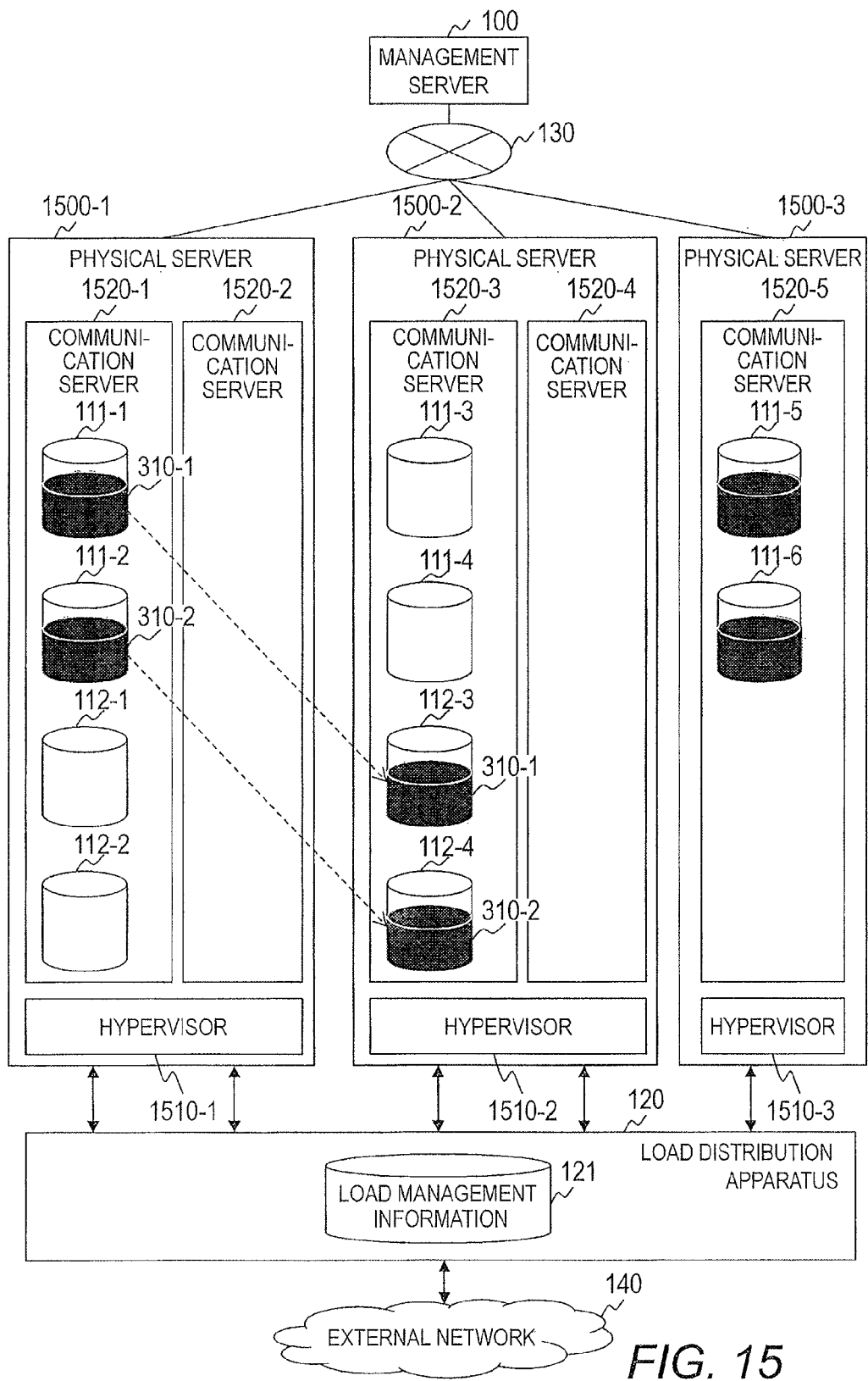
FIG. 15 is an explanatory diagram illustrating an example of a configuration of the communication system according to a third embodiment.

FIG. 15 is an explanatory diagram illustrating an example of a configuration of the communication system according to the third embodiment.

The third embodiment is different from the first embodiment in that a communication server 1520 is realized by using a virtual server generated upon the physical server having applied thereon a virtualization technology.

To be more specific, a program configured to realize a hypervisor 1510 is executed at a physical server 1500 having applied thereon the virtualization technology. The hypervisor 1510 is configured to generate at least one virtual server by logically dividing a computer resource of the physical server 1500.

A communication server 1520-1 according to the third embodiment includes the database 111-1 which stores therein a plurality of pieces of the first session information, and the database 111-2 which stores therein a plurality of pieces of the second session information. Also, the communication server 1520-1 includes the backup data 112-1 of the database 111-3, and the backup data 112-2 of the database 111-4.

A communication server 1520-2 according to the third embodiment includes the database 111-3 which stores therein a plurality of pieces of the first session information, and the database 111-4 which stores therein a plurality of pieces of the second session information. Also, the communication server 1520-2 is configured to retain the backup data 112-3 of the database 111-1, and the backup data 112-4 of the database 111-2.

It is assumed in the third embodiment that, due to an increased load on the communication server 1520-1, a communication server 1520-5 is newly generated on a physical server 1500-3. Further, it is also assumed that the management server 100 moves a portion of the plurality of pieces of the first session information stored in the database 111-1 included in the communication server 1520-1 to the database 111-5 of the communication server 1520-5, and moves a portion of the plurality of pieces of the second session information stored in the database 111-2 included in the communication server 1520-1 to the database 111-6 of the communication server 1520-5.

Note that since the plurality of pieces of the session information stored in the database 111 is the same as the information described in the first embodiment, and the description thereof will be omitted.

Note that since the load management information 121 is the same information as that described in the first embodiment, the description thereof will be omitted. Note, however, that the identifiers stored at the communication server ID 502 are different from those in the first embodiment.

To be more specific, in the third embodiment, information which includes the combination of the identifier of the physical server 1500 and the identifier of the communication server 1520 is stored in the communication server ID 502. This is due to that while an identifier that is unique is assigned to the virtual server on the physical server 1500, this unique identifier is unique within the physical server 1500 but may possibly overlap with another virtual server on another physical server 1500.

The property management information 314 according to the present embodiment is different from that according to other embodiments in that the property management information 314 according to the present embodiment includes "virtual" in the structure type 602. Other columns include the same information as that in the first embodiment.

FIG. 16 is an explanatory table illustrating an example of the operation management information 315 stored in the management server 100 according to the third embodiment.

The entry of the operation management information 315 according to the third embodiment includes a physical server ID 1601, a CPU usage rate 1602, a memory usage rate 1603, a virtual CPU usage rate 1605, a virtual memory usage rate 1606, a number of user accommodated 1607, a process data volume 1608, and a communication volume 1609.

The physical server ID 1601 is an identifier configured to uniquely identify the physical server 1500. The CPU usage rate 1602 indicates the use rate of the CPU included in the physical server 1500. The memory usage rate 1603 indicates the use rate of the memory included in the physical server 1500.

The virtual server ID 1604 is an identifier configured to uniquely identify the virtual server operating over the physical server 1500.

The virtual CPU usage rate 1605 indicates the use rate of the virtual CPU allocated to the virtual server which corresponds to the communication server 1520. The virtual memory usage rate 1606 indicates the use rate of the virtual memory allocated to the virtual server which corresponds to the communication server 1520. The number of user accommodated 1607 indicates the number of mobile terminal 201 accommodated at the communication server 1520.

The process data volume 1608 indicates the volume of the data (i.e., packet) processed by the communication server 1520. The process data volume 1608 is configured to store therein the number of packets or the volume of the packets processed within a certain period of time, or an integrated value of the number of packets or the volume of the packets processed up until a given period. The communication volume 1609 indicates the volume of the data (i.e., packet) transferred to the communication server 110 by the load distribution apparatus 120. The communication volume 1609 is configured to include the number of packets or the volume of the packets transferred to the communication server 1520 by the load distribution apparatus 120 within a certain period of time, an integrated value of the number of packets or the volume of the packets transferred to the communication server 110 up until a given period, the number of packets or the volume of the packets transmitted to the load distribution apparatus 120 by the communication server 1520 within a certain period of time, or an integrated value of the number of packet or the volume of the packet transmitted to the load distribution apparatus 120 by the communication server 1520 up until a given period.

Figure 17:
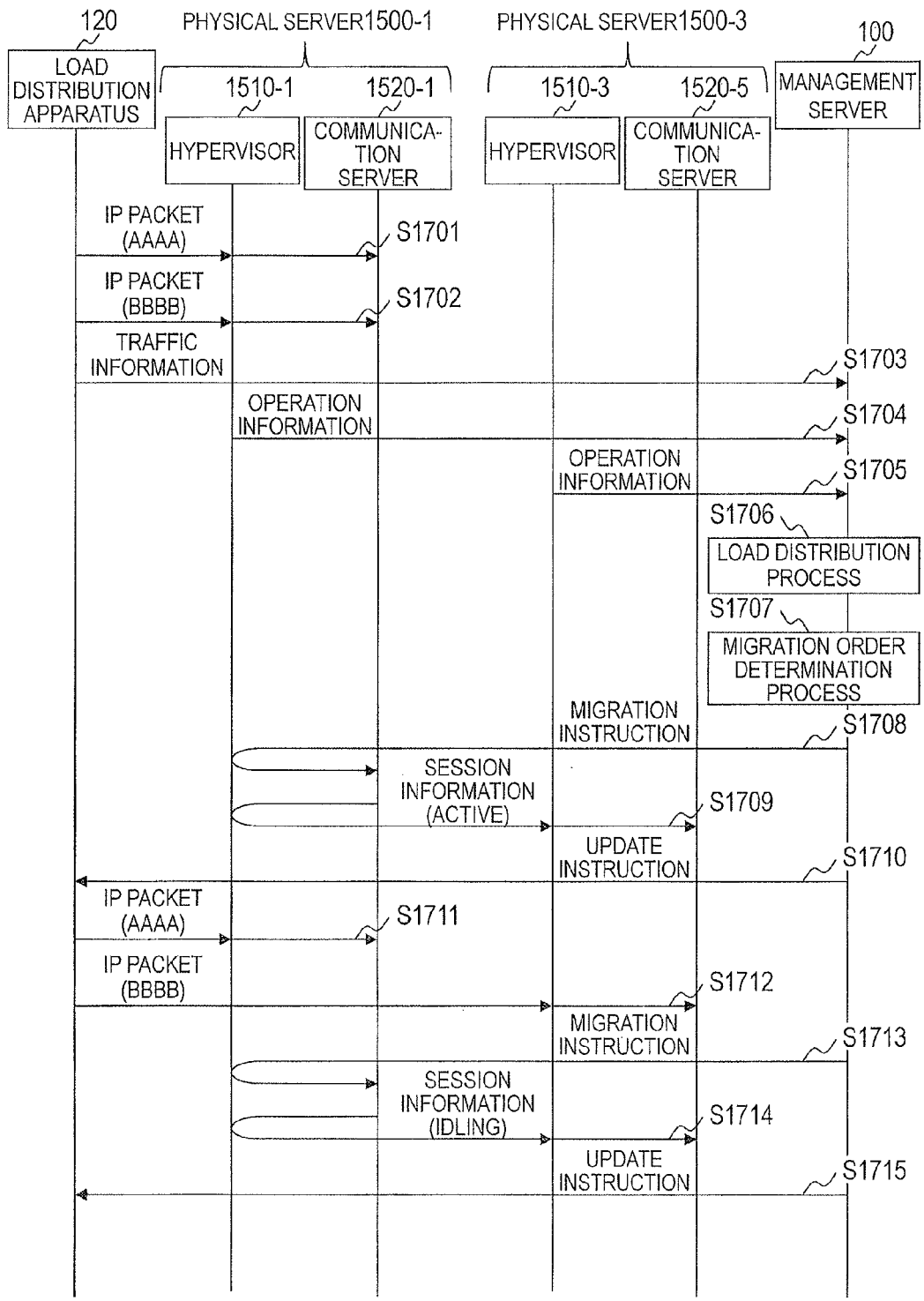
FIG. 17 is a sequence diagram describing the flow of processes by the communication system according to the third embodiment.

FIG. 17 is a sequence diagram describing the flow of processes by the communication system according to the third embodiment. In order to simplify the description, FIG. 17 omits the illustration of the physical server 1500-2.

Prior to the execution of the load distribution process, the load distribution apparatus 120 transmits the IP packet of a communication using the session whose session ID is "AAAA" and the IP packet of a communication using the session whose session ID is "BBBB" to the communication server 1520-1 (Step S1701, Step S1702).

In a case of receiving a packet from the load distribution apparatus 120, the hypervisor 1510-1 analyzes the packet so as to learn that the packet is addressed to the communication server 1520-1. The hypervisor 1510-1 transmits the received packet to the communication server 1520-1.

The management server 100 obtains traffic information from the load distribution apparatus 120 in a periodic manner (Step S1703). The process executed in Step S1703 is the same as that executed in Step S1005.

The management server 100 obtains the operation information of the physical server 1500-1, and the operation information of the communication server 1520 which operates on the physical server 1500-1 in a periodic manner (Step S1704).

To be more specific, the information obtaining unit 311 transmits the obtaining request for the operation information to the communication server 1500-1. The hypervisor 1510 of the physical server 1500 obtains the operation information of the physical server 1500, and the operation information of all the communication servers 1520 that operate on the physical server 1500, in a case of receiving the obtaining request. The hypervisor 151 transmits the operation information of the physical server 1500 and the operation information of each of the communication server 1520 to the information obtaining unit 311.

Note that since the method via which the hypervisor 1510 obtains the operation information from the physical server 1500 and the communication server 1520 is well known in the art, the description thereof will be omitted.

The management server 100 obtains the operation information of the physical server 1500-3 and the operation information of the communication server 1520 which operates on the physical server 1500-3 in a periodic manner (Step S1705). At this point the communication server 1520-5 is not yet generated, and therefore the operation information of the communication server 1520-5 cannot yet obtain.

The management server 100 determines whether or not to scale out via the method same as that used for corresponding determination in the first embodiment.

Here, it is assumed that the management server 100 determines to scale out. In such case, the management server 100 executes the load distribution process (Step S1706). In the load distribution process according to the third embodiment the load distribution control unit 312 adds the communication server 1520-5 to the communication server 1500-3 so as to activate the communication server 1520-5.

The management server 100, after the completion of the load distribution process, starts the migration process of the session information. In the migration process of the session information, the management server 100 first executes the migration order determination process (Step S1707). The process executed in Step S1707 is different from Step S1009 in that the communication server 1520 in Step S1707 is a virtual server. Note, however, the process details of Step S1707 are the same as those in Step S1009.

Here, it is assumed that the session information whose session ID is "BBBB" is selected as the first session information which will be moved to the newly added communication server 1520-5. Also, as for the migration order, it is assumed that the migration will be performed in the order of the first session information, and then the second session information.

The management server 100 transmits the migration instruction of the first session information to the communication server 1520-1 (Step S1708).

To be more specific, the session information migration control unit 313 transmits to the communication server 1520-1 the migration instruction of the session information whose session ID is "BBBB."

In a case of receiving the migration instruction, the hypervisor 1510-1 of the physical server 1500-1 analyzes the migration instruction so as to learn that the packet is addressed to the communication server 1520-1. The hypervisor 1510-1 transmits the received migration instruction to the communication server 1520-1.

The communication server 1520-1 transmits the first session information (i.e., session information whose session ID is "BBBB") to the communication server 1520-5 (Step S1709), in a case of receiving the migration instruction.

In a case of receiving a packet including the session information, the hypervisor 1510-3 of the communication server 1500-3 analyzes the packet so as to learn that the session information is addressed to the communication server 1520-5. The hypervisor 1510-3 transmits the session information to the communication server 1520-5. The communication server 1520-5 stores the received session information at the database 111-5.

The management server 100, after completing the migration of the first session information, transmits to the load distribution apparatus 120 the update instruction for updating the load management information 121 (Step S1710). The process executed in Step S1710 is the same as that executed in Step S1014. However, note that the identifier of the communication server 1520 of the migration destination included in the update instruction includes the information of the combination of the identifier of the physical server 1500-3 and the identifier of the communication server 1520-5.

After the process described above, the newly added communication server 1520-5 is configured to manage the communication using the session which corresponds to the moved first session information. In other words, the load distribution apparatus 120 transmits to the communication server 1520-1 the IP packet of the communication using the session whose session ID is "AAAA" (Step S1711), and transmits to the communication server 1520-5 the IP packet of the communication using the session whose session ID is "BBBB" (Step S1712).

The management server 100 transmits the migration instruction of the second session information to the communication server 1520-1 (Step S1713). The process executed in Step S1713 is the same as that executed in Step S1019.

In a case of receiving a packet including the migration instruction, the hypervisor 1510-1 of the communication server 1520 analyzes the packet so as to learn that the packet is the migration instruction addressed to the communication server 1520-1. The hypervisor 1510-1 transmits the migration instruction to the communication server 1520-1.

In a case of receiving the migration instruction, the communication server 1520-1 transmits to the communication server 1520-5 the second session information which corresponds to the session ID included in the migration instruction from the plurality of pieces of the second session information stored in the database 111-2 (Step S1714).

In a case of receiving a packet including the session information, the hypervisor 1510-3 of the physical server 1500-3 analyzes the packet so as to learn the packet is the session information addressed to the communication server 1520-5. The hypervisor 1510-3 transmits the session information to the communication server 1520-5. The communication server 1520-5 stores the received session information at the database 111-6.

The management server 100, after the completion of the migration of the second session information, transmits to the load distribution apparatus 120 the update instruction for updating the load management information 121 (Step S1715). The process executed in Step S1715 is the same as that executed in Step S1023. However, note that the identifier of the communication server 1520 of the migration destination included in the update instruction includes the information of the combination of the identifier of the physical server 1500-3 and the identifier of the communication server 1520-5.

By virtue of the configuration according to the third embodiment, it becomes possible to achieve the same effect as that for the first embodiment even with the physical server 1500 having applied thereon the virtual technology.

Fourth Embodiment

A fourth embodiment is different from the first embodiment in that the migration order of the session information is determined based on policy information. Hereinafter, the fourth embodiment will be described by focusing on differences between the first embodiment and the fourth embodiment.

Figure 18:
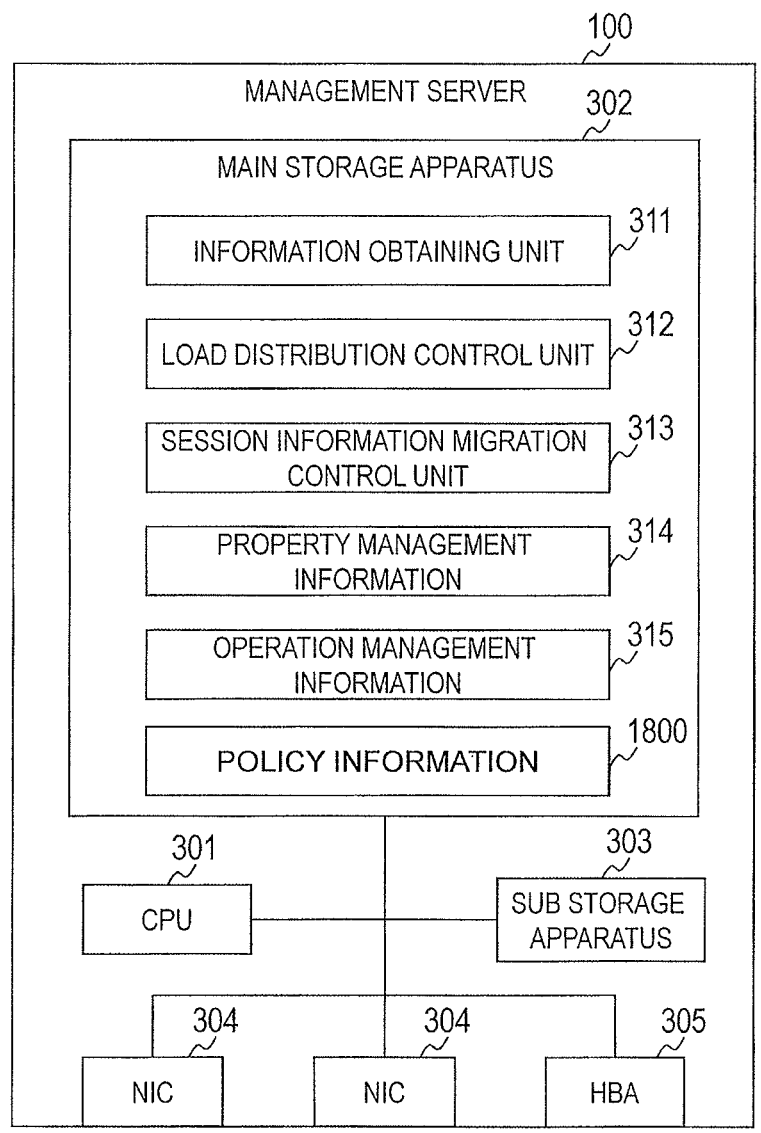
FIG. 18 is a block diagram illustrating an example of a hardware configuration and a software configuration of the management server according to a fourth embodiment.

Note that since the configuration of the communication system according to the fourth embodiment is the same as that in the first embodiment, and the description thereof will be omitted. FIG. 18 is a block diagram illustrating an example of a hardware configuration and a software configuration of the management server 100 according to the fourth embodiment.

The hardware configuration of the management server 100 according to the fourth embodiment is the same as that according to the first embodiment. However, the software configuration of the management server 100 according to the fourth embodiment is different from that according to the first embodiment. To be more specific, the main storage apparatus 302 stores therein policy information 1800. Other programs and information stored in the main storage apparatus 302 according to the fourth embodiment are the same as those according to the first embodiment.

The policy information 1800 is information for referring by the session information migration control unit 313 in a case of determining the migration order of the plurality of pieces of the session information. It is assumed that the policy information 1800 is configured in advance in the management server 100. Note that the operator of the present system is operable to change the policy information 1800.

Here, the policy information 1800 will be described. FIG. 19 is an explanatory table illustrating an example of the policy information 1800 stored in the management server 100 according to the fourth embodiment.

The policy information 1800 includes an entry for each migration condition. In other words, the policy information 1800 includes an entry for each piece of the migration condition information. The entry of the policy information 1800 includes a policy ID 1901, a migration condition 1902, and a migration order 1903.

The policy ID 1901 is an identifier configured to uniquely identify a policy. The migration condition 1902 includes a migration condition for detecting the migration trigger of the session information. The migration order 1903 includes information used as an indicator for determining the migration order via which the plurality of pieces of the session information is moved. The migration order 1903 stores therein information configured to reduce down time for the communication using the session which corresponds to the session information, and to have the effect of the moving of the session information reflected on the communication system in a swift manner.

In the first embodiment, the operator of the present system uses the user interface 900 to set the migration condition information by inputting the migration condition and the migration order, while the management server 100, based on the input migration condition information, determines the migration order. In the fourth embodiment, the management server 100 includes the policy information 1800 including the migration condition information in which an optimal migration order is set for each migration condition, and determines the migration order for the plurality of pieces of the session information in an automatic manner in accordance with the migration condition.

The policy information 1800 is operable to set various policies in accordance with the migration condition. In a case where the migration condition includes a situation such as an increase of the load on the CPU, lack of memory, or an increase of the number of users accommodated, the policy may be set in accordance with each migration condition, for example.

In a case where the increase in the CPU load is the migration condition, wherein the load of the CPU of the communication server 110 is increased due to the increase in the volume of transfer of data, the policy may move the first session information first in order to have the effect of the load distribution process reflected swiftly. Further, in a case where the lack of memory or the increase in the number of users accommodated is the migration condition, the policy may move the second session information first.

Figure 20:
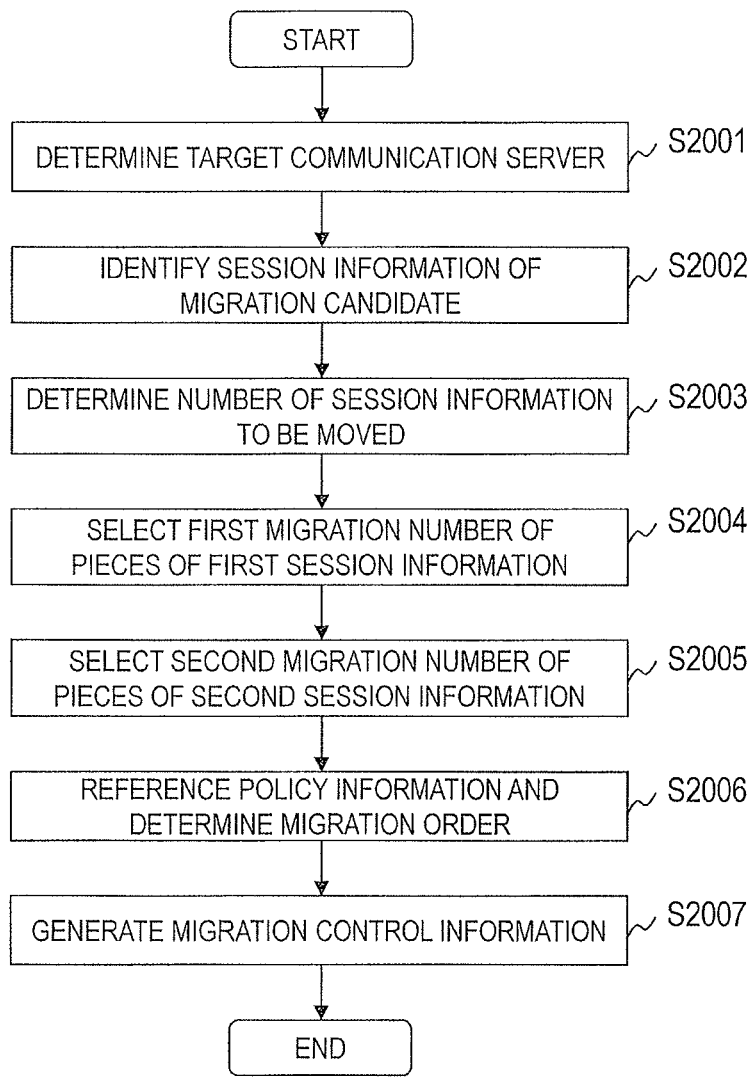
FIG. 20 is a flowchart for describing an example of the migration order determination process executed by the session information migration control unit of the management server according to the fourth embodiment.

FIG. 20 is a flowchart for describing an example of the migration order determination process executed by the session information migration control unit 313 of the management server 100 according to the fourth embodiment.

Note that the processes executed in Step S2001 through Step S2005 are the same those executed in Step S1201 through Step S1205. The process executed in Step S2007 is the same as that executed in Step S1207.

The session information migration control unit 313 refers to the policy information 1800 so as to determine the migration order for the plurality of pieces of the session information (Step S2006).

To be more specific, the session information migration control unit 313 searches for an entry in which the condition to start the load distribution process notified from the load distribution control unit 312 corresponds to the migration condition 1902 of the policy information 1800. In other words, the session information migration control unit 313 searches the policy information 1800 for an entry matching the migration condition which corresponds to the detected migration trigger. The session information migration control unit 313 determines in accordance with the migration order 1903 of the retrieved entry the migration order for the plurality of pieces of the session information.

Figure 21A:
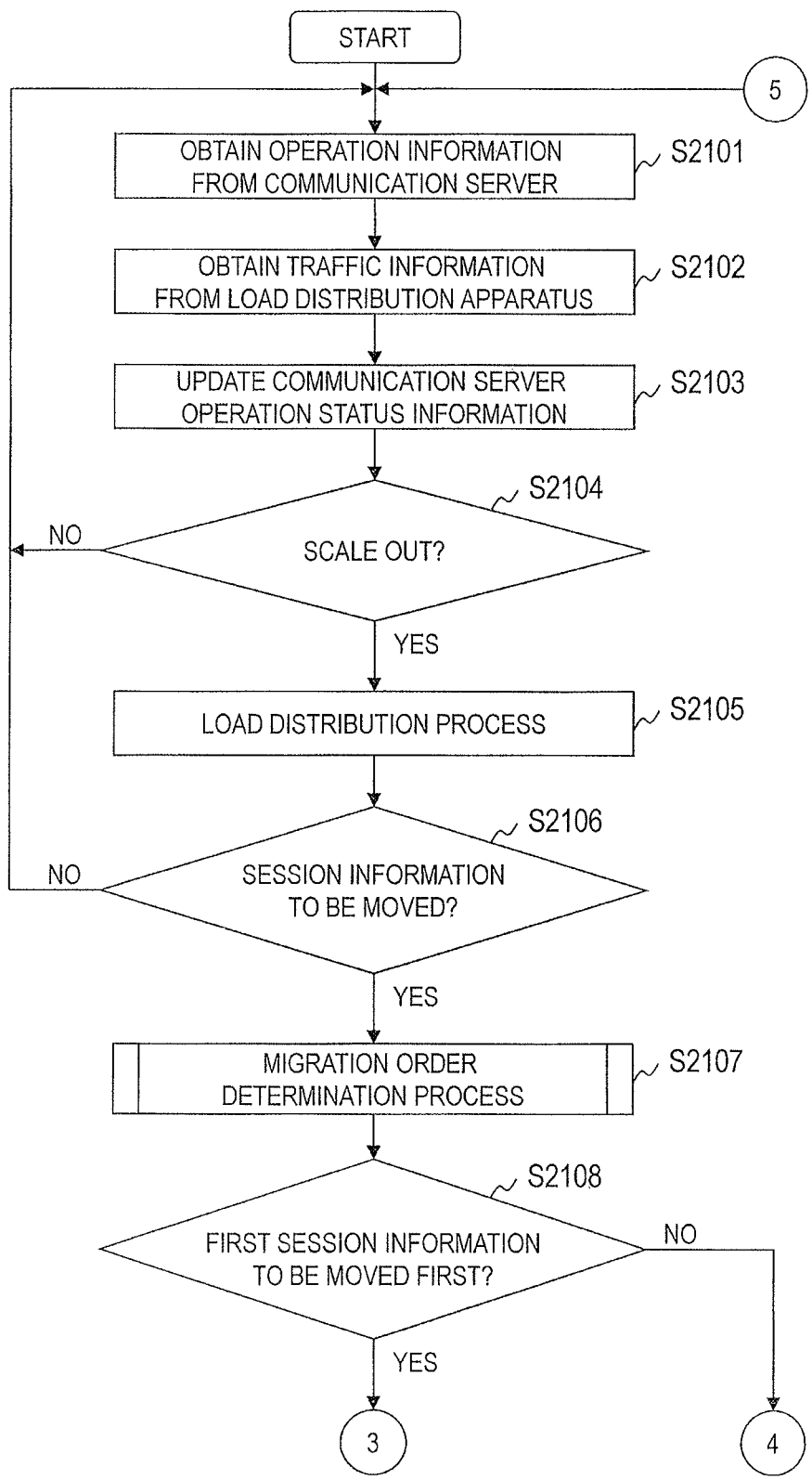
FIG. 21A, FIG. 21B, and FIG. 21C are flowcharts each describing the outline of processes executed by the management server according to the fourth embodiment.
Figure 21B:
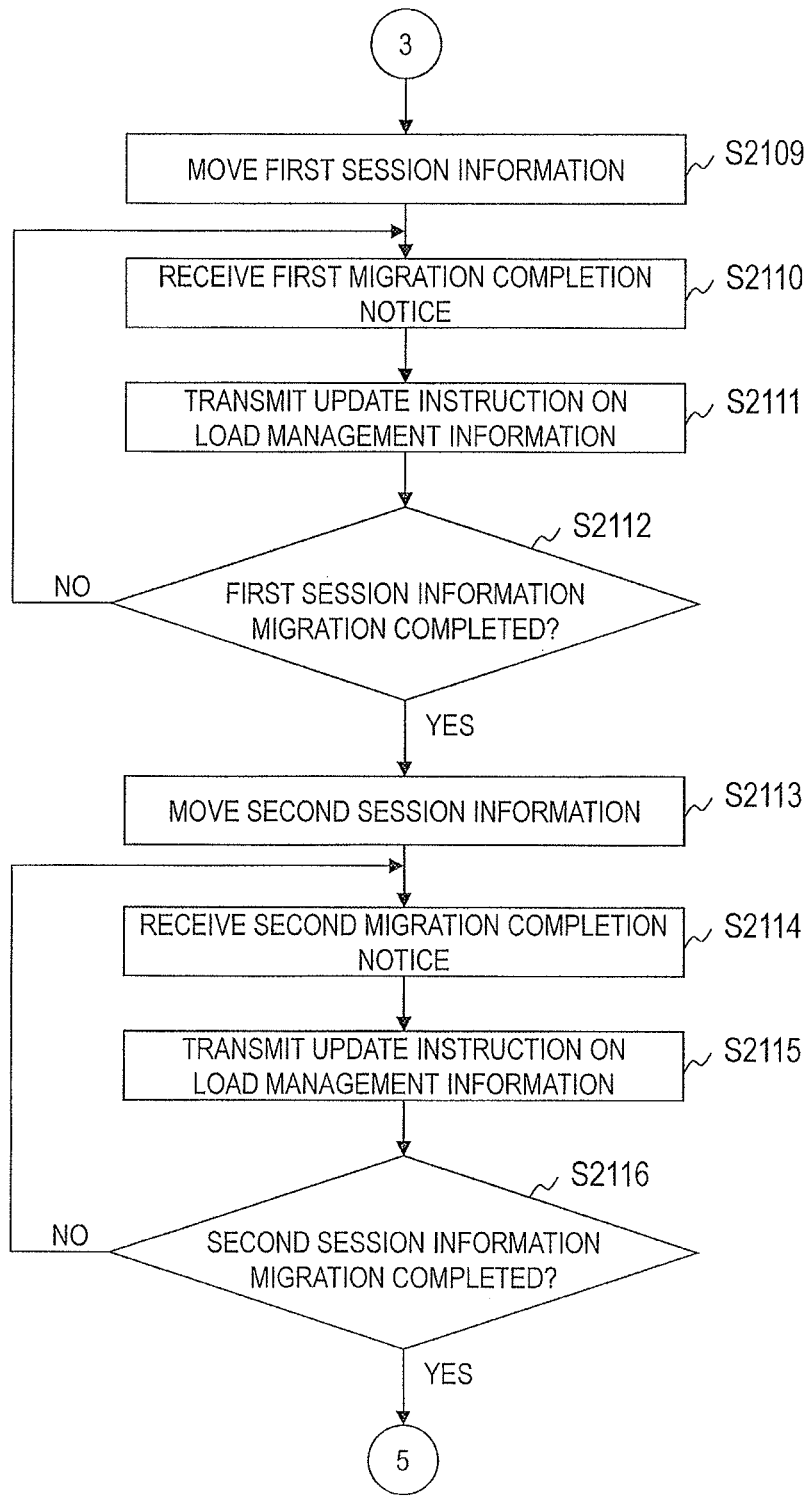
Figure 21C:
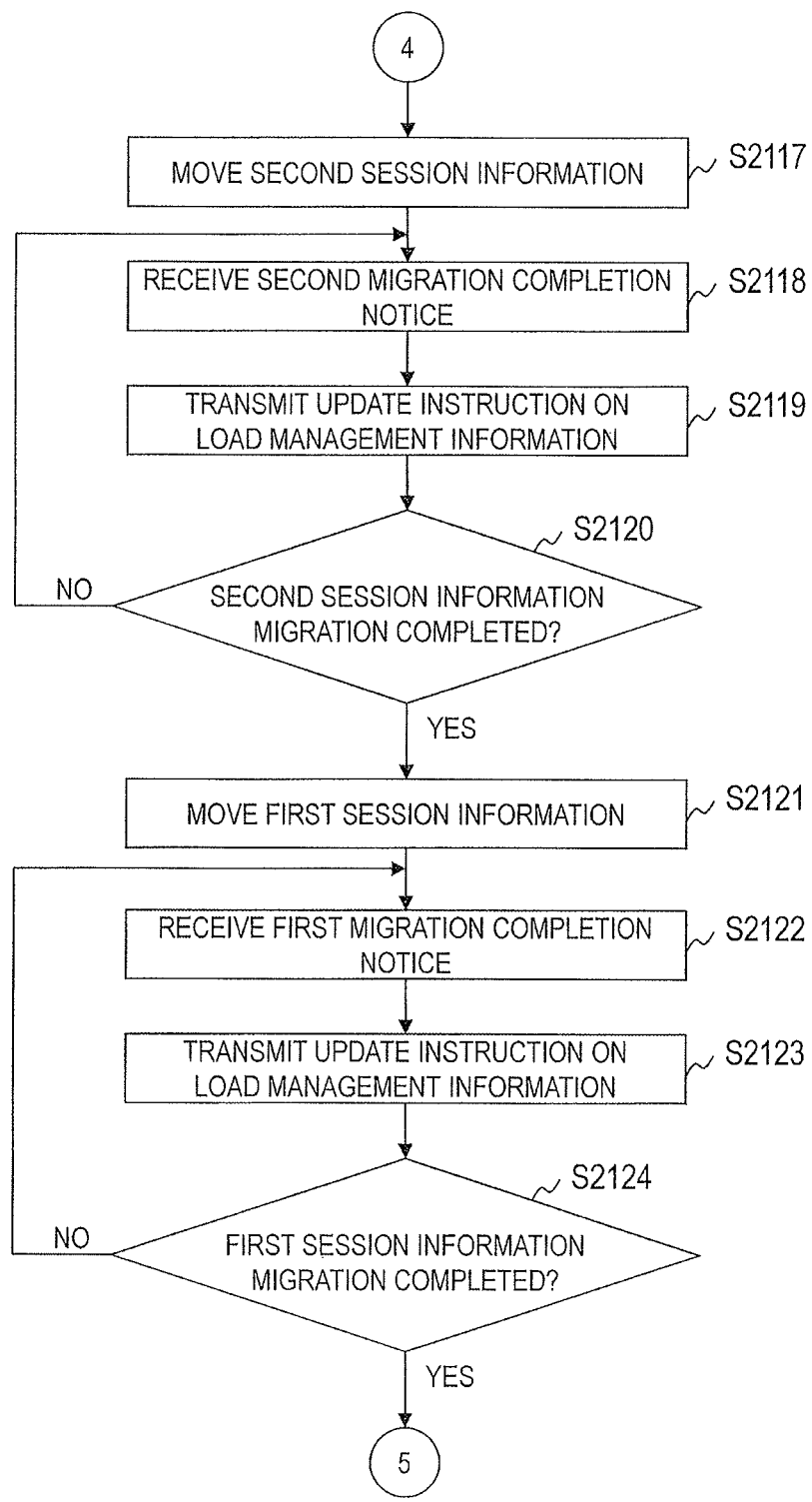

FIG. 21A, FIG. 21B, and FIG. 21C are flowcharts each describing the outline of the processes executed by the management server 100 according to the fourth embodiment.

Note that the processes executed in Step S2101 through Step S2106 are the same those executed in Step S1102 through Step S1107. Note, however, that the load distribution control unit 312 notifies the session information migration control unit 313 of the condition to start the load distribution process in Step S2105. Also note that the process executed in Step S2107 is as described with reference to FIG. 20.

The session information migration control unit 313, after the execution of the migration order determination process (Step S2107), determines whether or not to move the first session information first based on the migration control information (Step S2108).

In a case where it is determined that the first session information will be moved first, the session information migration control unit 313 moves at least one piece of the first session information from the communication server 110 of the migration source to the communication server 110 of the migration destination (Step S2109). Note that the processes executed in Step S2109 through Step S2116 are the same as those executed in Step S1109 through Step S1116.

In a case where it is determined that the second session information will be moved first, the session information migration control unit 313 moves at least one piece of the second session information from the communication server 110 of the migration source to the communication server 110 of the migration destination (Step S2117). Note that the processes executed in Step S2117 through Step S2120 are the same as those executed in Step S1113 through Step S1116.

In a case where it is determined in the process executed in Step S2120 that the migration of the second session information is completed, the session information migration control unit 313 moves at least one piece of the first session information from the communication server 110 of the migration source to the communication server 110 of the migration destination (Step S2121). Note that the processes executed in Step S2121 through Step S2124 are the same as those executed in Step S1109 through Step S1112.

In a case where it is determined in the process executed in Step S2124 that the migration of the second session information is completed, the management server 100 returns to Step S2102, and executes the same process in said Step.

By virtue of the configuration according to the fourth embodiment the management server 100 is operable to determine the migration order of the plurality of pieces of the session information in an automatic manner in accordance with the migration condition. By this, the management load on the operator will be reduced.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing (operating) modules, and processing (operation) means, for all or a part of them, may be implemented by hardware: for example, by designing an integrated circuit.

The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A communication system comprising:
a plurality of computers including a first computer that manages a first database and a second computer that manages a second database, wherein each of the plurality of computers includes:
a communication interface that is communicatively coupled to a plurality of terminals,
a database stored in a memory, and
a processor communicatively coupled to the communication interface and the memory; and
a management computer, wherein the management computer includes:
a management communication interface that is communicatively coupled to the plurality of computers,
a management memory, and
a management processor communicatively coupled to the management communication interface and the memory;
wherein the processor of each particular computer from the plurality of computers:
controls a communication session of each of the plurality of terminals, and
manages the database of the particular computer, wherein the database stores a plurality of pieces of session information and each of the plurality of pieces of session information corresponds to the session of each of the plurality of terminals;
wherein the management processor:
obtains operation information indicating an operation status of the plurality of computers;
stores, in the management memory, property management information for managing a property of each of the plurality of pieces of session information stored in the database of each of the plurality of computers and
stores, in the management memory, operation management information for managing the operation status of the plurality of computers,
detects a migration trigger of a plurality of pieces of session information stored in the first database based on the operation management information;
selects a selected plurality of pieces of session information to be moved to the second database from the plurality of pieces of session information stored in the first database based on the property management information;
determines a determined migration order for the selected plurality of pieces of session information based on the property of the each of the selected plurality of pieces of session information;
generates migration control information including the determined migration order; and
moves the selected plurality of pieces of session information from the first database to the second database according to the migration control information.

2. The communication system according to claim 1,
wherein the property of the piece of session information includes information indicating the status of the session corresponding to the piece of session information,
wherein the status of the session includes an active status and an idle status, wherein the active status indicates active terminals from the plurality of terminals that are operable to perform communication, and wherein the idle status indicates idle terminals from the plurality of terminals that are inoperable to perform communication,
wherein the database stores a plurality of pieces of first session information each of which corresponds to the session in the active status, and a plurality of pieces of second session information each of which corresponds to the session in the idle status,
wherein the management processor further:
selects at least one piece of first session information to be moved to the second database from the plurality of pieces of first session information stored in the first database;
selects at least one piece of second session information to be moved to the second database from the plurality of pieces of second session information stored in the first database;
determines to move the plurality of pieces of session information to the second database in the order of the at least one piece of first session information, and the at least one piece of second session information;
generates the migration control information including identification information of the first computer, identification information of the second computer, an identifier of the selected at least one piece of first session information, the identifier of the selected at least one piece of second session information, and the determined migration order; and
moves the selected at least one piece of first session information from the first database to the second database based on the migration control information,
wherein the processor of the second computer:
stores the selected at least one piece of first session information in the second database in a case of receiving the selected at least one piece of first session information; and
starts a communication process for one or more of the plurality of terminals using the selected at least one piece of first session information,
wherein the processor of the first computer: transmits a migration completion notice to the management computer, and
wherein the management processor further:
moves the selected at least one piece of second session information from the first database to the second database in case of receiving the migration completion notice.

3. The communication system according claim 2,
wherein the plurality of computers further includes a third computer;
wherein the processor of each particular computer further:
manages backup data that is a copy of a database of another computer from the plurality of computers,
wherein the property of the piece of session information includes information indicating whether the piece of session information is session information stored in the backup data, and
wherein the management processor further:
specifies, by referring the property management information, the third computer which manages backup data storing therein the selected at least one piece of second session information;
generates the migration control information including identification information of the first computer which is a migration source of the selected at least one piece of first session information, identification information of the third computer which is a migration source of the selected at least one piece of second session information, identification information of the second computer, an identifier of the selected at least one piece of first session information, an identifier of the selected at least one piece of second session information, and the determined migration order; and move the selected at least one piece of second session information stored in the backup data of the third computer to the second database in case of migrating the selected at least one piece of second session information.

4. The communication system according claim 2, wherein the management processor further:

selects the at least one piece of first session information to be moved to the second database to maintain a number of pieces of first session information stored in the first database and a number of pieces of first session information stored in the second database even; and selects the at least one piece of second session information to be moved to the second database to maintain a number of pieces of second session information stored in the first database and a number of pieces of second session information stored in the second database even.

5. The communication system according to claim 1, wherein the property of the piece of session information includes information indicating status of the session corresponding to the piece of session information, wherein the status of the session includes an active status and an idle status, wherein the active status indicates active terminals from the plurality of terminals that are operable to perform communication, and wherein the idle status indicates idle terminals from the plurality of terminals that are inoperable to perform communication wherein the management memory stores a plurality of pieces of first session information each of which corresponds to the session in the active status, and a plurality of pieces of second session information each of which corresponds to session in the idle status, and wherein the management computer further:

stores, in the management memory, policy information including a plurality of entries, each of the plurality of entries is information with which a migration condition for detecting the migration trigger of the plurality of pieces of session information, and the migration order for moving to the plurality of pieces of session information determined based on the status of the session are correlated, and wherein the management processor further:

selects at least one piece of first session information to be moved to the second database from the plurality of pieces of first session information stored in the first database;

selects at least one piece of second session information to be moved to the second database from the plurality of pieces of second session information stored in the first database;

searches, by referring the migration condition of each of the plurality of entries stored in the policy information, for an entry matching the migration condition corresponding to the migration trigger that is detected;

determines the migration order for moving the selected at least one piece of first session information, and the selected at least one piece of second session information, based on the migration order of the entry;

generates the migration control information including identification information of the first computer, identification information of the second computer, an identifier of the selected at least one piece of first session information, the identifier of the selected at least one piece of second session information, and the determined migration order; and moves the selected at least one piece of first session information, and the selected at least one piece of second session information from the first database to the second database based on the migration control information.

6. A management computer comprising:

a communication interface that is communicatively coupled to a plurality of terminals, and is communicatively coupled to a plurality of computers, wherein the plurality of computers include a first computer that manage a first database, and a second computer that manage a second database;

a memory;

a processor communicatively coupled to the memory and the communication interface;

wherein the processor:

manages a database storing therein a plurality of pieces of session information, each of the plurality of pieces of session information corresponds to the session of each of the plurality of terminals, obtains operation information indicating an operation status of the plurality of computers, detects a migration trigger of the plurality of pieces of session information stored in the database managed by the first computer, stores property management information for managing a property of each of the plurality of pieces of session information stored in the memory detects the migration trigger of the plurality of pieces of session information stored in the first database based on operation management information that indicates the operation status of the plurality of computers;

selects a selected plurality of pieces of session information to be moved to the second database from the plurality of pieces of session information stored in the first database based on the property management information;

determines a determined migration order for the selected plurality of pieces of session information based on the property of the each of the selected plurality of pieces of session information; and generates migration control information including the determined migration order.

7. The management computer according to claim 6, wherein the property of the piece of session information includes information indicating the status of the session corresponding to the piece of session information, wherein the status of the session includes an active status and an idle status, wherein the active status indicates active terminals from the plurality of terminals that are operable to perform communication, and wherein the idle status indicates idle terminals from the plurality of terminals that are inoperable to perform communication wherein the memory stores a plurality of pieces of first session information each of which corresponds to the session in the active status, and a plurality of pieces of second session information each of which corresponds to the session in the idle status, and wherein the processor further:

selects at least one piece of first session information to be moved to the second database from the plurality of pieces of first session information stored in the first database;
selects at least one piece of second session information to be moved to the second database from the plurality of pieces of second session information stored in the first database;
determines to move the plurality of pieces of session information to the second database in the order of the at least one piece of first session information, and the at least one piece of second session information;
generates the migration control information including identification information of the first computer, identification information of the second computer, an identifier of the selected at least one piece of first session information, the identifier of the selected at least one piece of second session information, and the determined migration order;
moves the selected at least one piece of first session information from the first database to the second database based on the migration control information; and
moves the selected at least one piece of second session information from the first database to the second database in case of receiving a migration completion notice for which notifying the migration of the selected at least one piece of first session information is completed, from the first database.

8. The management computer according to claim 7,
wherein plurality of computers further includes a third computer that manages a third database;
wherein the processor further:
manages backup data which is a copy of the database managed by another communication control unit different from the communication control unit,
wherein the property of the piece of session information includes information indicating whether the piece of session information is session information stored in the backup data, and
wherein the processor further:
specifies, by referring the property management information, the third computer which manages backup data storing therein the selected at least one piece of second session information;
generates the migration control information including identification information of the first computer which is a migration source of the selected at least one piece of first session information, identification information of the third computer which is the migration source of the selected at least one piece of the second session information, identification information of the second computer, the identifier of the selected at least one piece of first session information, the identifier of the selected at least one piece of second session information, and the determined migration order; and
moves the selected at least one piece of second session information stored in the backup data managed by the third computer to the second database in case of moving the selected at least one piece of second session information.

9. The management computer according to claim 7,
wherein the processor further:
selects the at least one piece of first session information to be moved to the second database to maintain a number of pieces of first session information stored in the first database and a number of pieces of first session information stored in the second database even; and
selects the at least one piece of second session information to be moved to the second database to maintain a number of pieces of second session information stored in the first database and a number of pieces of second session information stored in the second database even.

10. The management computer according to claim 6,
wherein the property of the piece of session information includes information indicating the status of the session corresponding to the piece of session information,
wherein the status of the session includes an active status and an idle status, wherein the active status indicates active terminals from the plurality of terminals that are operable to perform communication, and wherein the idle status indicates idle terminals from the plurality of terminals that are inoperable to perform communication
wherein the memory stores a plurality of pieces of first session information each of which corresponds to the session in the active status, and a plurality of pieces of second session information each of which corresponds to the session in the idle status, and
the processor further:
stores, in the memory, policy information including a plurality of entries, each of the plurality of entries is information with which a migration condition for detecting the migration trigger of the plurality of pieces of session information, and the migration order for moving to the plurality of pieces of session information determined based on the status of the session are correlated,
selects at least one piece of first session information to be moved to the second database from the plurality of pieces of first session information stored in the first database;
selects at least one piece of second session information to be moved to the second database from the plurality of pieces of second session information stored in the first database;
searches, by referring the migration condition of each of the plurality of entries stored in the policy information, for the entry matching the migration condition corresponding to the migration trigger that is detected;
determines the migration order for moving the selected at least one piece of first session information, and the selected at least one piece of second session information, based on the migration order of the entry;
generates the migration control information including identification information of the computer, identification information of the second computer, an identifier of the selected at least one piece of first session information, the identifier of the selected at least one piece of second session information, and the determined migration order; and
moves the selected at least one piece of first session information, and the selected at least one piece of second session information from the first database to the second database based on the migration control information.

11. A session information migration method comprising
a first step of detecting, by a management computer, a migration trigger of a plurality of pieces of session information stored in a first database based on operation management information stored in a memory of the management computer, wherein the first database is managed by a first computer from a plurality of computers, wherein the plurality of computers are communicatively coupled to a plurality of terminals;

a second step of selecting, by the management computer, a selected plurality of pieces of session information to be moved to a second database from the plurality of pieces of session information stored in the first database based on property management information, wherein the second database is managed by a second computer from the plurality of computers;

a third step of determining, by the management computer, a determined migration order for the selected plurality of pieces of session information based on a property of the each of the selected plurality of pieces of session information; and a fourth step of generating, by the management computer, migration control information including the determined migration order.

12. The session information migration method according to claim 11, wherein the property of the piece of session information includes information indicating a status of the session corresponding to the piece of session information, wherein the status of the session includes an active status and an idle status, wherein the active status indicates active terminals from the plurality of terminals that are operable to perform communication, and wherein the idle status indicates idle terminals from the plurality of terminals that are inoperable to perform communication, wherein the memory of the management computer stores a plurality of pieces of first session information each of which corresponds to the session in the active status, and a plurality of pieces of second session information each of which correspond to the session in the idle status, wherein the second step includes:

a fifth step of selecting at least one piece of first session information to be moved to the second database from the plurality of pieces of first session information stored in the first database; and a sixth step of selecting at least one piece of second session information to be moved to the second database from the plurality of pieces of second session information stored in the first database, wherein the third step includes a step of determining to move the plurality of pieces of session information to the second database in the order of the at least one piece of first session information, and the at least one piece of second session information, wherein the fourth step includes a step of generating the migration control information including identification information of the computer, identification information of the second computer, an identifier of the selected at least one piece of first session information, the identifier of the selected at least one piece of second session information, and the determined migration order, and wherein the session information migration method includes:

a step of moving, by the management computer, the selected at least one piece of first session information from the first database to the second database based on the migration control information;

a step of storing, by the second computer, the selected at least one piece of first session information in the second database in case of receiving the selected at least one piece of first session information;

a step of starting, by the second computer, a communication process of a first terminal from the plurality of terminals using the selected at least one piece of first session information;

a step of transmitting, by the first computer, a migration completion notice to the management computer; and a step of moving, by the management computer, the selected at least one piece of second session information from the first database to the second database in case of receiving the migration completion notice.

13. The session information migration method according to claim 12, wherein the fifth step includes a step of selecting the at least one piece of first session information to be moved to the second database to maintain a number of pieces of first session information stored in the first database and a number of pieces of first session information stored in the second database even, and wherein the sixth step includes a step of selecting the at least one piece of second session information to be moved to the second database to maintain a number of pieces of second session information stored in the first database and a number of pieces of second session information stored in the second database even.

14. The session information migration method according to claim 11, wherein the property of the piece of session information includes information indicating a status of the session corresponding to the piece of session information, wherein the status of the session includes an active status and an idle status, wherein the active status indicates active terminals from the plurality of terminals that are operable to perform communication, and wherein the idle status indicates idle terminals from the plurality of terminals that are inoperable to perform communication, wherein the memory of the management computer stores a plurality of pieces of first session information each of which corresponds to the session in the active status, and a plurality of pieces of second session information each of which corresponds to the session in the idle status, wherein the management computer stores, in the memory, policy information including a plurality of entries, each of the plurality of entries is information with which a migration condition for detecting the migration trigger of the plurality of pieces of session information, and the migration order for moving to the plurality of session information determined based on the status of the session are correlated, wherein the second step includes:

a seventh step of selecting at least one piece of first session information to be moved to the second database from the plurality of pieces of first session information stored in the first database; and an eighth step of selecting at least one piece of second session information to be moved to the second database from the plurality of pieces of second session information stored in the first database, wherein the third step includes:

a step of searching, by referring the migration condition of each of the plurality of entries stored in the policy information, for an entry matching the migration condition corresponding to the migration trigger that is detected; and a step of determining the migration order for moving the selected at least one piece of first session information, and the selected at least one piece of second session information, based on the migration order of the entry, wherein the fourth step includes a step of generating the migration control information including identification information of the first computer, identification information of the second computer, an identifier of the selected at least one piece of first session information, the identifier of the selected at least one piece of second session information, and the determined migration order, and wherein the session information migration method includes a step of moving, by the management computer, the selected at least one piece of first session information, and the selected at least one piece of second session information from the first database to the second database based on the migration control information.

15. The session information migration method according to claim 14, wherein each of the plurality of computers manage backup data which is a copy of the database managed by a different computer from the plurality of computers, wherein the property of the piece of session information includes information indicating whether the piece of session information is session information stored in the backup data, wherein the eighth step includes a step of specifying, by the management computer, by referring the property management information, a third communication control unit which manages backup data storing therein the selected at least one piece of second session information, wherein the fourth step includes a step of generating the migration control information including identification information of the first computer which is a migration source of the selected at least one piece of first session information, identification information of the third communication control unit which is the migration source of the selected at least one piece of the second session information, identification information of the second computer, the identifier of the selected at least one piece of first session information, the identifier of the selected at least one piece of second session information, and the determined migration order, and wherein the session information migration method includes a step of moving the selected at least one piece of second session information stored in the backup data managed by the third communication control unit to the second database in case of moving the selected at least one piece of second session information.

\* \* \* \* \*